(12) United States Patent
Takaoka et al.

(10) Patent No.: US 9,106,558 B2
(45) Date of Patent: Aug. 11, 2015

(54) SWITCH DEVICE, INFORMATION PROCESSING APPARATUS, AND METHOD OF CONTROLLING SWITCHING DEVICE

(71) Applicant: FUJITSU LIMITED, Kawasaki-shi (JP)

(72) Inventors: Masanori Takaoka, Kawasaki (JP); Shuhei Nishi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 255 days.

(21) Appl. No.: 13/854,186

(22) Filed: Apr. 1, 2013

(65) Prior Publication Data

US 2013/0223214 A1   Aug. 29, 2013

Related U.S. Application Data

(63) Continuation of application No. PCT/JP2010/068389, filed on Oct. 19, 2010.

(51) Int. Cl.
*H04L 12/801* (2013.01)
*H04L 12/935* (2013.01)
*H04L 12/931* (2013.01)

(52) U.S. Cl.
CPC ............... *H04L 47/12* (2013.01); *H04L 49/30* (2013.01); *H04L 49/503* (2013.01)

(58) Field of Classification Search
CPC .......... H04L 49/00; H04L 47/00; H04L 12/00
USPC ................... 370/229, 230, 386, 389
See application file for complete search history.

(56) References Cited

U.S. PATENT DOCUMENTS

2002/0105949 A1*   8/2002   Shinomiya ................... 370/386
2005/0276263 A1*   12/2005   Suetsugu et al. .............. 370/389
2008/0159130 A1*   7/2008   Abe ............................. 370/229

FOREIGN PATENT DOCUMENTS

JP      2002-232427      8/2002
JP      2006-186924      7/2006
JP      2008-098720      4/2008
WO      WO-2007/029297   3/2007

OTHER PUBLICATIONS

International Search Report, mailed in connection with PCT/JP2010/068389 and mailed Nov. 30, 2010.

* cited by examiner

*Primary Examiner* — Andrew Lai
*Assistant Examiner* — Sumitra Ganguly
(74) *Attorney, Agent, or Firm* — Fujitsu Patent Center

(57) ABSTRACT

A switch device includes a relay unit relaying communication data when information processing units included in an information processing apparatus perform communications with external devices; an address learning unit registering ports receiving the communication data in association with addresses indicating transmission sources of the communication data; and a band control unit controlling a bandwidth to be allocated to the communications by setting a first port and a second port of the ports to belong to a same group and by setting the first port and the second port to belong to different groups based on a number of addresses registered by the address learning unit in association with each of the ports.

9 Claims, 16 Drawing Sheets

SWITCH DEVICE, INFORMATION PROCESSING APPARATUS, AND METHOD OF CONTROLLING SWITCHING DEVICE

CROSS-REFERENCE TO RELATED APPLICATION

This application is a continuation application of International Application PCT/JP2010/068389 filed on Oct. 19, 2010 and designated the U.S., the entire contents of which are incorporated hereby reference.

FIELD

The embodiments discussed herein are related to a switch device, an information processing apparatus, and a method of controlling the switch device.

BACKGROUND

The following packet communication device is known. Each line package includes an L2 switch including plural LAN-line accommodation ports and a setting unit mutually connecting ports of the L2 switch. The line package may be connected to another line package using an unused port of the L2 switch as a backup port. When a failure such as a congestion state is detected, a control package changes the setting of the setting unit, so that a failed line package is switched to another line package in which no failure is detected.

Reference may be made to Japanese Laid-open Patent Publication No. 2006-186924.

SUMMARY

According to an aspect of the present invention, a switch device includes a relay unit relaying communication data when information processing units included in an information processing apparatus perform communications with external devices; an address learning unit registering ports receiving the communication data in association with addresses indicating transmission sources of the communication data; and a band control unit controlling a bandwidth to be allocated to the communications by setting a first port and a second port of the ports to belong to a same group and by setting the first port and the second port to belong to different groups based on a number of addresses registered by the address learning unit in association with each of the ports.

The objects and advantages of the embodiments disclosed herein will be realized and attained by means of the elements and combinations particularly pointed out in the claims.

It is to be understood that both the foregoing general description and the following detailed description are exemplary and explanatory and are not restrictive of the invention as claimed.

DESCRIPTION OF EMBODIMENTS

An aspect of this disclosure provides a switch device that controls bandwidth allocation in accordance with the number of addresses per port.

In the following, embodiments of the present invention are described with reference to the drawings.

Figure 1:
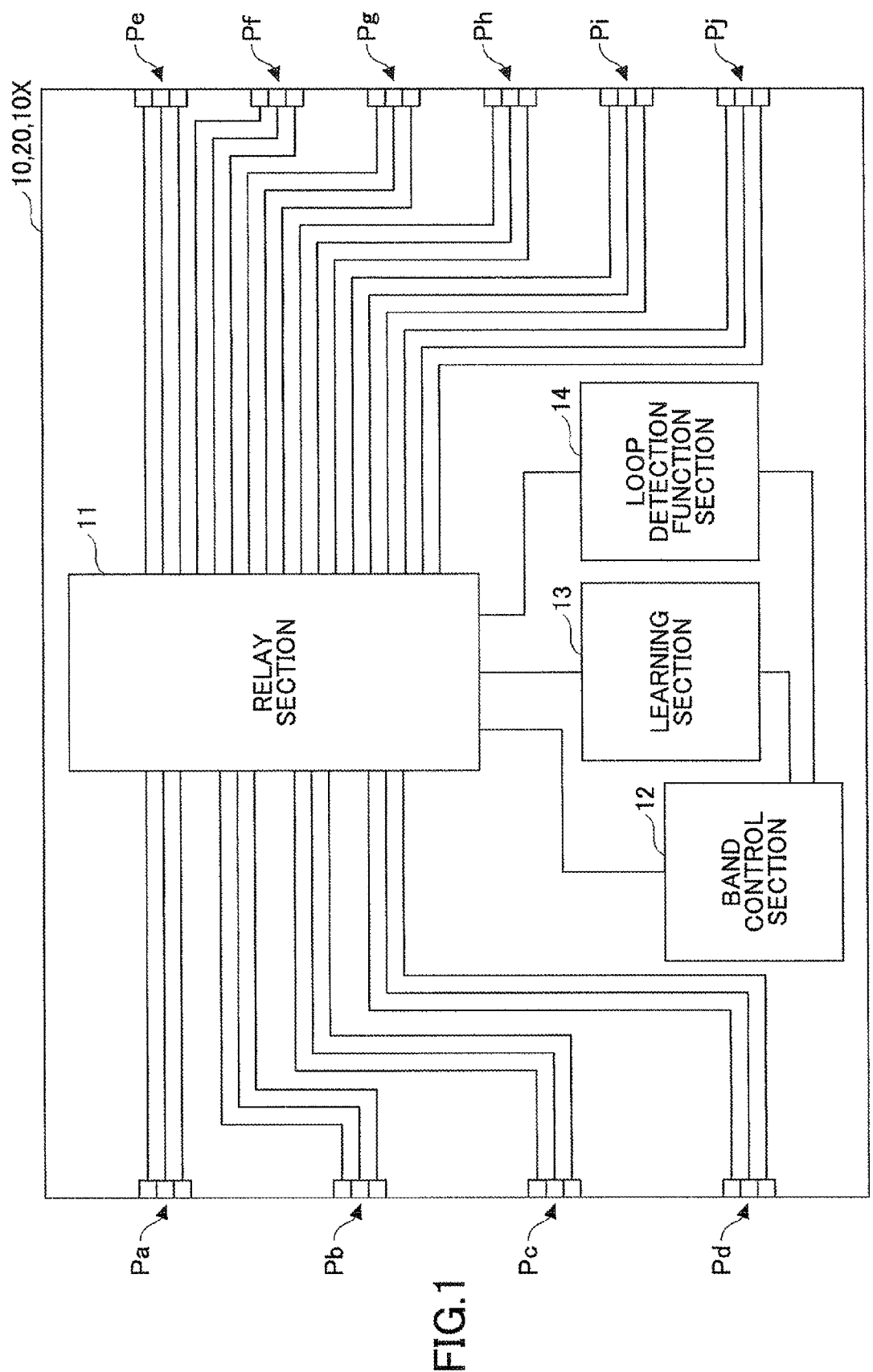
FIG. 1 is an example block diagram of a configuration of a switch device (switch blade) according to first or second embodiment.

FIG. 1 is a block diagram of an example internal configuration of a switch device 10, 10X, or 20 (hereinafter may be referred to as a switch blade) according to a first embodiment. As may be described below with reference to FIG. 2 or the like, the switch device having such a configuration as illustrated in FIG. 1 may be provided inside an information processing apparatus (hereinafter may be referred to as a "blade server").

The information processing apparatus includes not only the switch device but also plural information processing units (hereinafter may be referred to as "server blades"). The information processing units are described below with reference to FIG. 2 and the like.

The switch device serves as a layer 2 switch that relays communication data (including packet data) between the information processing unit and another information processing unit included in another information processing unit via another switch device.

The switch device includes a relay section 11, a band control section 12, a learning section 13, a loop detection function section 14, and plural port sections Pa, Pb, Pc, ..., Pj. Further, the plural port sections Pa, Pb, Pc, ..., Pj may include respective plural ports. For example, the port section Pa may have plural ports (e.g., three ports as illustrated in FIG. 1).

The relay section 11 has a switching function, receives communication data, reads delivery addresses included in the communication data, and transmits the communication data to a terminal having the delivery addresses.

More specifically, for example, the relay section 11 of the switch device 10 receives communication data from an information processing unit in the information processing apparatus, which includes the relay section 11, via a port section (one of Pa, ..., and Pd). Further, the relay section 11 reads the delivery (destination) Media Access Control (MAC) address of the destination terminal. The MAC address is included in the communication data.

Further, the relay section 11 transmits the communication data to the port section corresponding to the read MAC address. The communication data transmitted from the relay section 11 are further transmitted to, for example, the destination terminal (e.g., the information processing unit provided in another information processing apparatus) via the port section, another switch device or the like.

On the other hand, the relay section 11 receives transmission data that have been transmitted from the information processing unit in another information processing apparatus via another switch device and a port section (any of Pe, ..., and Pj). The relay section 11 reads the MAC address of the destination terminal.

The MAC address is included in the communication data. Then, the relay section 11 transmits the communication data to the port section (any of Pa, ..., and Pd) corresponding to the MAC address.

The transmission data from the relay section 11 are transmitted to the destination terminal (i.e., the information processing unit in the information processing apparatus including switch device) via the port section.

The learning section 13 associates the port section with the MAC address, the port section receiving the communication data that is received by the relay section 11, the MAC address being included in the received communication data and corresponding to the destination terminal. Further, the learning section 13 registers the associated port section with the MAC address in a MAC learning table described below.

Hereinafter the registration of the associated port section, that receives the transmission data received by the relay section 11, with the MAC address included in the received transmission data and corresponding to the destination terminal may be simplified as MAC learning.

Further, the information to be registered into the MAC table is related to the data that are being transmitted. Therefore, after the communication is finished or abnormally terminated, the data in the MAC learning table are deleted.

Figure 16:
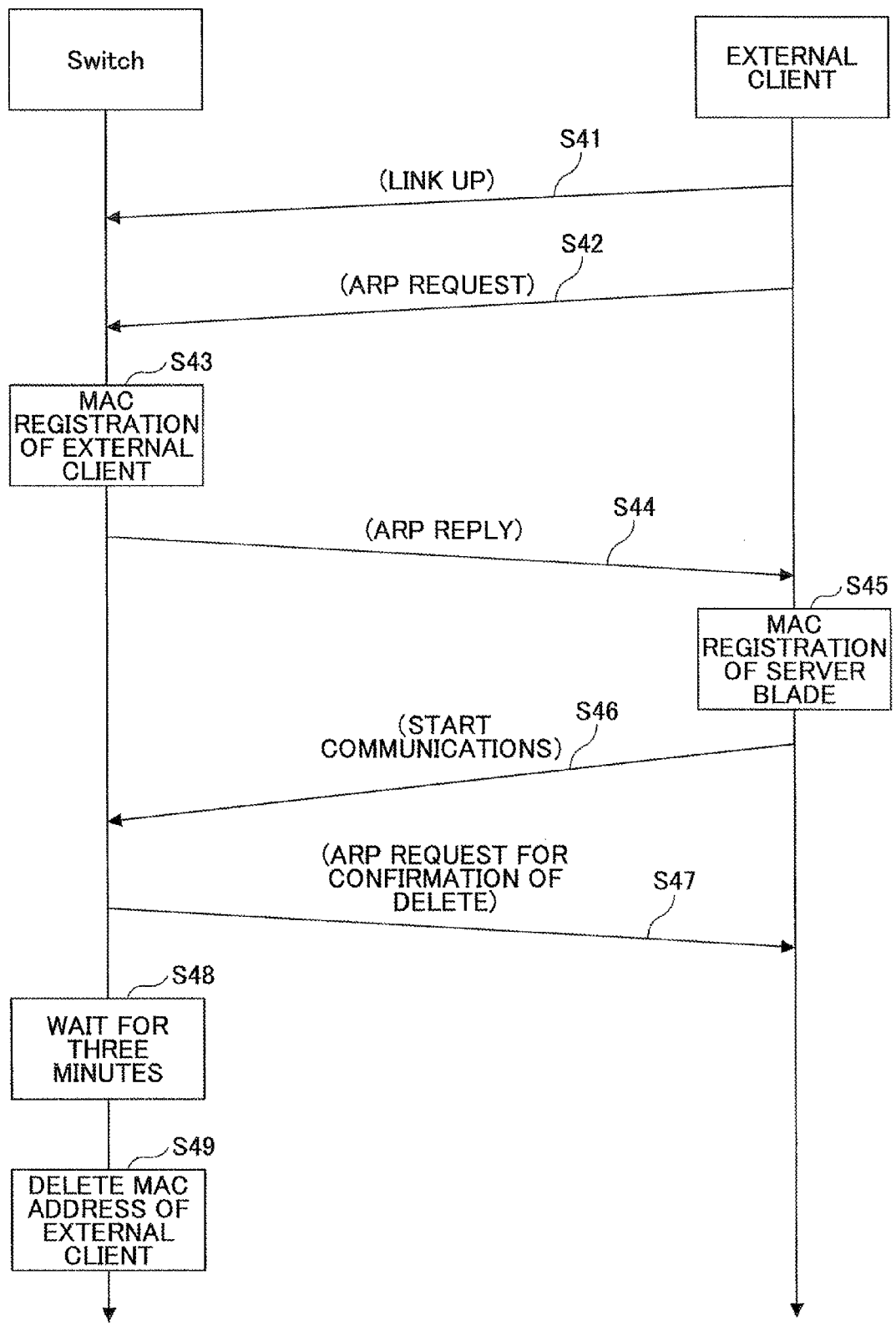
FIG. 16 is an example sequence diagram illustrating an operation of MAC learning performed by a switch device to be applied to the first or the second embodiment.

Details of the deletion of the information registered in the MAC learning table (i.e., details of the deletion of the entries from the MAC learning table) are described with reference to FIG. 16 below.

The band control section 12 forms a group of the port sections and dissolves the group of the port sections based on the number of the MAC addresses in the MAC learning of the learning section 13. The band control section 12 controls the band allocation that is used when the transmission data relayed by the relay section 11 are transmitted and received.

Details of the operations of the band control section 12 are described below with reference to FIG. 2 and the like.

The outline of the functions of the band control section 12 is described below.

For example, a case is described where the number of the information processing units in the information processing apparatus is increased to increase the number of communication lines so that the bandwidth is increased.

In such a case, when the number of the opposing terminals to which the communication data are relayed by the relay section 11 is increased as the result of the increase of the number of the information processing units, the number of the MAC addresses in the MAC learning by the learning section 13 is accordingly increased.

Here, the MAC addresses in the MAC learning by the learning section 13 refers to the registration entry number (the number of registration) in the MAC learning table described below with reference to FIG. 2, and hereinafter may be simplified as the MAC learning number.

Further, the band control section 12 detects the increase of the MAC learning number of the learning section 13, and forms a group of the port sections in a manner that the port section accommodating (including) the lines currently used and a port section accommodating the backup lines are grouped (included into the same group).

As a result of grouping with the group accommodating the backup lines, the backup lines are added into the same group as that of the port section accommodating the lines currently used.

Therefore, the bandwidth allocated to the information processing unit may be increased. Namely, by adding the information processing units, the bandwidth allocated to the information processing unit may be increased.

Therefore, for example, in a case where the communication load (i.e., traffic) is expected to be increased due to the addition of the information processing units, the band control section 12 detects the increase of the MAC learning number of the learning section 13, and adds the backup lines to the lines currently used. As a result, the bandwidth may be increased by additionally allocating information processing units to the current information processing units.

In the same manner, for example, a case is described where the number of the information processing units in the information processing apparatus is decreased and accordingly the number of communication lines is decreased so that the bandwidth may be decreased.

In such a case, when the number of the opposing terminals to which the communication data are relayed by the relay section 11 is decreased as the result of the decrease of the number of the information processing units, the MAC learning number of the learning section 13 is accordingly decreased.

Then, the band control section 12 detects the decrease of the MAC learning number of the learning section 13, and dissolves the group including the port section accommodating the lines currently used. As a result of dissolving the group including the port section accommodating the lines currently used, some of the lines currently used may be separated as the backup lines so as not to be used. Therefore, the bandwidth allocated to the information processing unit is decreased.

As described above, as a result of removing the information processing unit, the bandwidth allocated to the information processing unit may be decreased. Therefore, in a case where the decrease of the communication load is expected due to the decreasing of the information processing units, the band control section 12 detects the decrease of the MAC learning number, and decreases the number of lines allocated to the information processing units. As a result, the bandwidth allocated to the remaining information processing units after decreasing the information processing units may be decreased.

The loop detection function section 14 transmits loop detection packet data, and detects the generation of loop by determining whether the transmitted loop detection packet data are returned thereto. Here, the loop detection packet data may be, for example, packet data having the MAC address FF:FF:FF:FF:FF:FF (i.e., address for broadcast packet data).

Next, with reference to FIGS. 2 through 8, details of an example configuration of the switch device according to the first embodiment are described.

Figure 2:
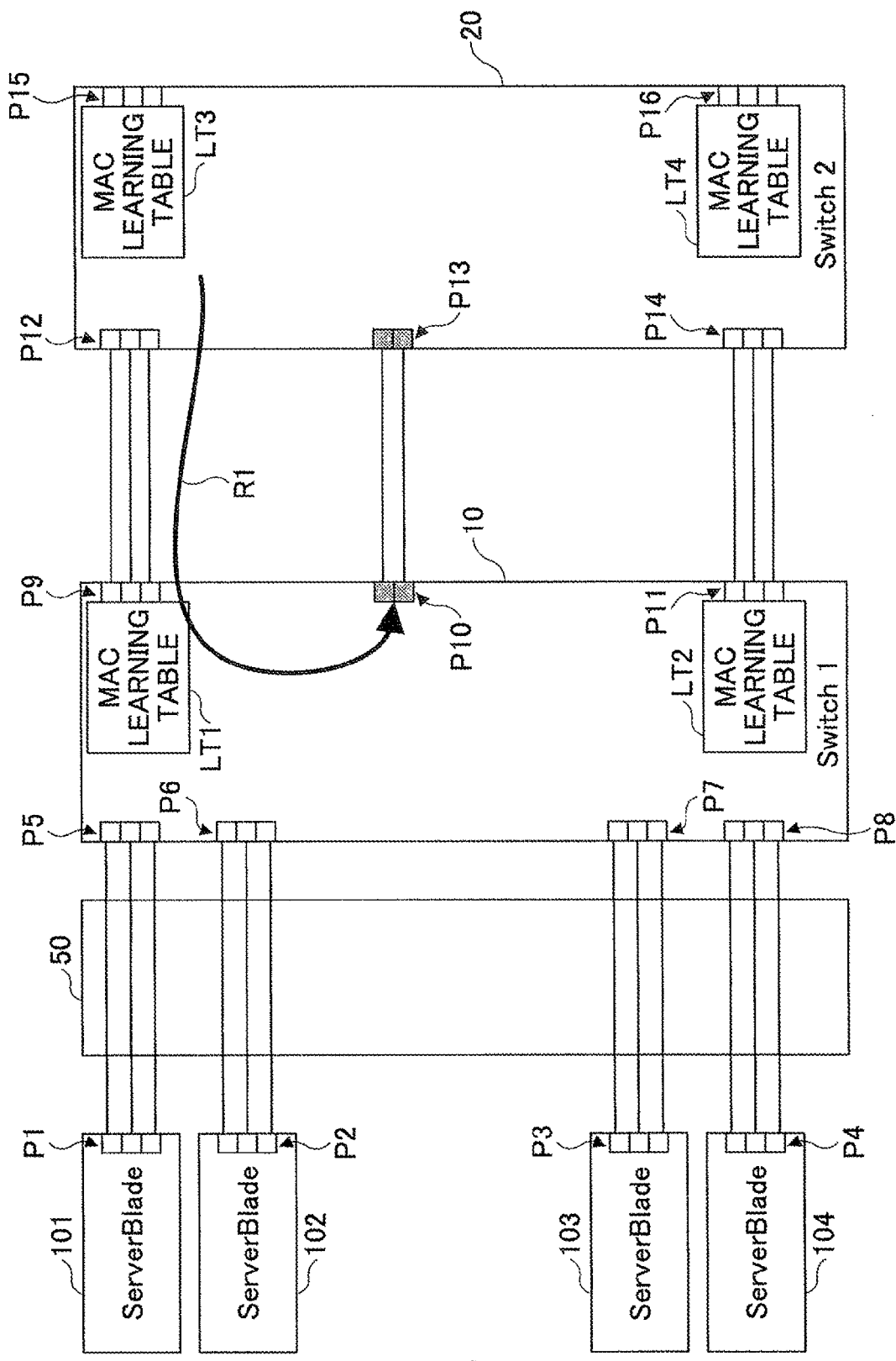
FIG. 2 is another example block diagram illustrating an operation of the switch device according to the first embodiment.

FIG. 2 illustrates a switch device 10 according to the first embodiment (hereinafter may be simplified as switch 1), information processing units 101, 102, 103, and 104, and a mid plane 50. FIG. 2 further illustrates another switch device 20 (hereinafter may be simplified as a switch 2) provided outside of the information processing apparatus.

The mid plane 50 herein refers to a board providing connections between the information processing units 101, 102, 103, and 104 and the switch device 10.

The information processing units 101, 102, 103, and 104 includes port parts P1, P2, P3, and P4, respectively, that are used to be connected to the switch device 10. The switch device 1 includes port sections P5 through P8, which correspond to the port sections Pa through Pd described above with reference to FIG. 1. In the same manner, the switch device 1 further includes port sections P9 through P11, which correspond to, for example, the port sections Pe through Pg described above with reference to FIG. 1.

In FIG. 2, the port section P10 includes two ports. However, the port section P10 may include, for example, three ports as the port sections in FIG. 1.

Similarly, the switch device 20 includes port sections P12 through P14, which correspond to, for example, the port sections Pa through Pc described above with reference to FIG. 1.

Similar to above, in FIG. 2, the port section P13 includes two ports. However, the port section P13 may include, for example, three ports as the port sections in FIG. 1. Also, the switch device 20 includes port sections P15 and P16, which correspond to, for example, the port sections Pe and Pf described above with reference to FIG. 1.

As illustrated in FIG. 2, the port sections P1 through P4 of the information processing units 101 through 104, respectively are electrically connected to any of the port sections P5 through P9 of the switch device 10 using wire lines.

The port sections P9 through P11 of the switch device 10 are electrically connected to any of the port sections P12 through P14 of the switch device 20 using wire lines.

The port sections P15 and P16 of the switch device 20 are electrically connected to any of the port sections (not shown) of switch devices or the like (not shown) in, for example, another information processing apparatus (not shown) using wire lines.

Further, the switch device 10 includes MAC learning tables LT1 and LT2. Also, the switch device 20 includes MAC learning tables LT3 and LT4. The MAC learning tables LT1 and LT2 are used for the MAC learning of the learning section 13 of the switch device 10 in FIG. 1. Also, the MAC learning tables LT1 and LT2 are used for the MAC learning of the learning section 13 of the switch device 20 in FIG. 1.

Here, the relay sections 11 of the switch devices 10 and 20 have a link aggregation function and a Virtual Local Area Network (VLAN) function as described below with reference to FIG. 15A. Further, a user of the information processing apparatus may perform the following settings using the VLAN function. First, "VLAN=a" is set as the VLAN information indicating the VLAN to which the port section P9 of the switch device 10 and the port section P12 of the switch device 20 belong. The port sections P9 and P12 face each other.

Also, "VLAN=b" is set as the VLAN information indicating the VLAN to which the port sections P11 and P14, facing each other, belong. Also, "VLAN=c" is set as the VLAN information indicating the VLAN to which the port sections P10 and P13, facing each other, belong.

As a result, the port sections P9 and P12 belonging to "VLAN=a" belong to a segment of "VLAN=a". Also, the port sections P11 and P14 belonging to "VLAN=b" belong to a segment of "VLAN=b". Also, the port sections P10 and P13 belonging to "VLAN=c" belong to a segment of "VLAN=c"

Further, the user of the information processing apparatus uses the link aggregation function to set, for example, the following settings. First, "Group A" is set, as the information indicating a link aggregation group to which the port sections P9 and P12 belong, to the port section P9 of the switch device 10 and the port section P12 of the switch device 20, the port sections P9 and P12 facing each other.

Also, "Group B" is set to the port sections P11 and P14 facing each other. Also, "Group C" is set to the port sections P10 and P13 facing each other. As a result, the lines (three lines in FIG. 3) accommodated by the section parts P9 and P12 may be theoretically treated as a single line.

Further, the line accommodated by the port section may be referred to as a "port section accommodation line". For example, the port section accommodation line accommodated by the port sections P9 and P12 may be referred to as "port section P9 P12 accommodation line".

Similarly, the port section P11 P14 accommodation line (three lines in FIG. 2) belonging to Group B may be interpreted as a single theoretical line. Also, the port section P10 P13 accommodation line (two lines in FIG. 2) belonging to Group C may be interpreted as a single theoretical line.

Further, the user may activate a loop detection function of the loop detection function section 14 in the switch 20. Further, in the initial condition, for example, the port section P10 of the switch device 10 may be set to an off-line state, and the port section P13, facing the port section P10, of the switch device 20 may also be set to the off-line state.

As a result, the communications using the port section P10 P13 accommodation line are impossible (inhibited). Here, the on-line state of the port section refers to a state where it is possible to use the port section for the communications. On the other hand, the off-line state of the port section refers to a state where it is impossible to use the port section for the communications.

For example, when the port section P10 is set to the off-line state, the broadcast packet data (e.g., the loop detection packet data) transmitted from the switch device 20 are transmitted to the switch device 10 via the port section P9 P12 accommodation line but are prevented from being returned to the switch device 20 via the port section P10 P13 accommodation line.

Figure 3:
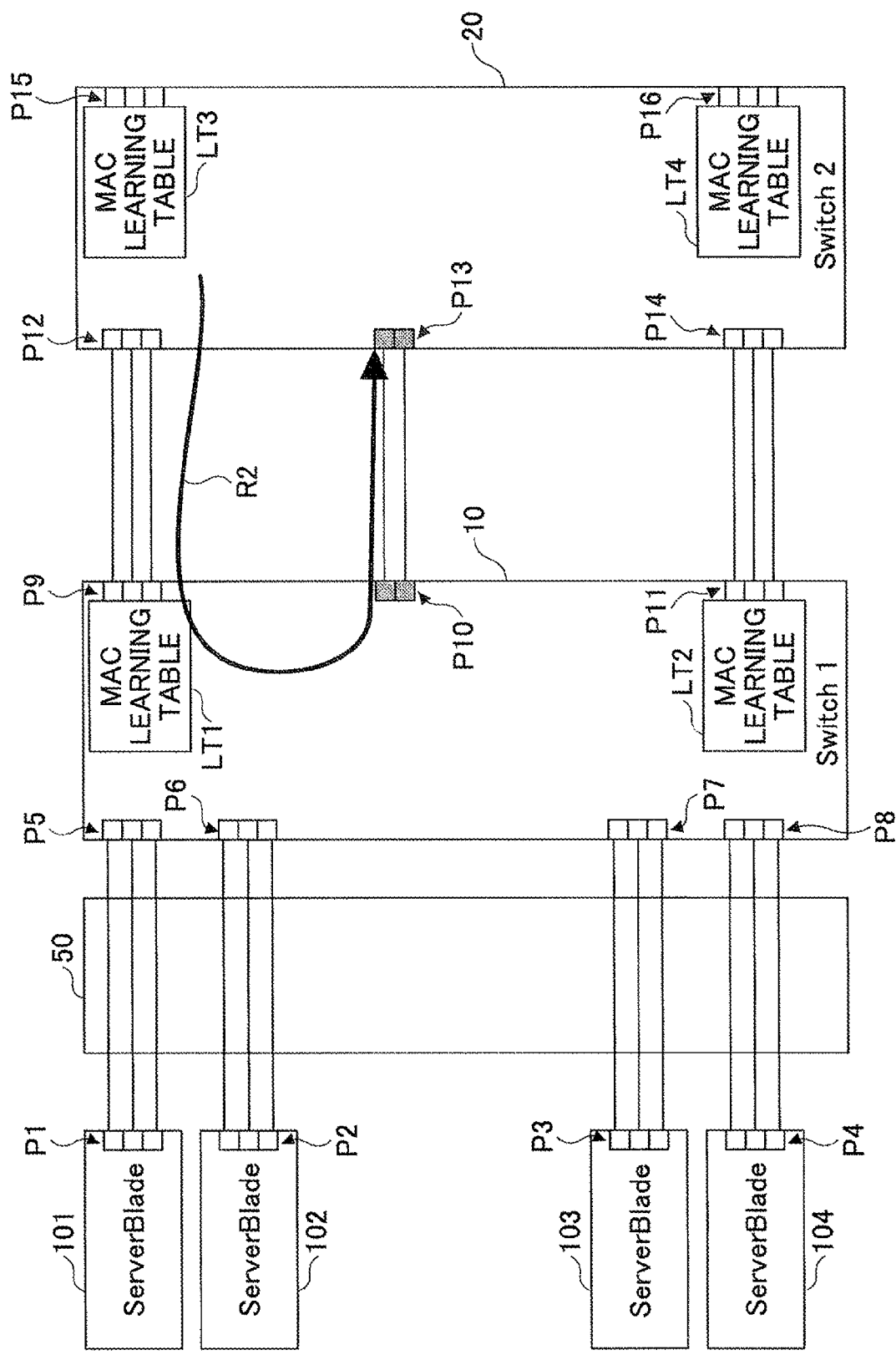
FIG. 3 is still another example block diagram illustrating an operation of the switch device according to the first embodiment.

FIG. 3 illustrates operations in a case where the MAC learning number of the port section P9 of the switch device 10 exceeds a threshold value set by the user. Here, the MAC learning number of the port section P9 refers to the MAC learning number determined based on the communication data transmitted and received via the port section P9. This also applies to the other port sections.

In FIG. 3, the MAC learning number of the port section P9 of the switch device 10 exceeds the threshold value set by the user, the band control section 12 of the switch device 10 detects that the MAC learning number exceeds the threshold value. Upon detecting that the MAC learning number exceeds the threshold value, the band control section 12 changes the state of the port section P10 from the off-line state to the on-line state.

On the other hand, the loop detection function section 14 in the switch 20 periodically transmits the loop detection packet data. The loop detection packet data from the loop detection function section 14 are transmitted to the switch device 10 via the port section P12 of the switch device 20 and the port section P9 of the switch device 10.

As described above, the loop detection packet data are broadcast packet data transmitted to the switch device 10 may be a broadcast packet data having the delivery MAC address FF:FF:FF:FF:FF:FF. Due to this, the loop detection packet data may be returned to the switch device 20 via the lines accommodated by the port section P10, whose state is changed from the off-line state to the on-line state, and the port section P13 of the switch device 20, the port sections P10 and P13 facing each other (see route R2 in FIG. 3).

As a result, the switch device 20 detects that the loop detection packet data originally transmitted from the switch device 20 is returned to the switch device 20. Further, upon the detection of the (returned) loop detection packet data, the switch device 20 changes the state of the port section P13 from the on-line state to the off-line state, and further changes the setting of the port part P13 VLAN=c to VLAN=a. Further, the switch device 20 changes the group of the link aggregation to which the port section P13 belongs from Group C to Group A.

After that, the switch 20 further changes the state of the port section P13 to the on-line state. In this case, after a predetermined time period has passed since the state of the port section P10 is changed to the on-line state, the switch device 10 changes the group of the link aggregation of the port section P10 from Group C to Group A.

The predetermined time period is thought to be appropriate if the predetermined time period is longer than, for example, a time period from when the loop detection packet data, which are periodically transmitted, are transmitted from the switch device 20 to when after the loop detection packet data are returned to the switch device 20, the switch device 20 detects the return of the loop detection packet data.

As a result of the operations described above, the VLAN information setting of the port section P10 P13 accommodation line between the switch device 10 and the switch device 20 is changed to VLAN=a which is the same as that of the port section P9 P12 accommodation line. Further, the group of the link aggregation of the port section P10 P13 accommodation line is set to Group A.

Namely, the port sections P9 and P10 are grouped (Group A) and the port sections P12 and P13 of the switch device 20 are also grouped (Group A). As a result, the port section P9 P12 accommodation line and the port section P10 P13 accommodation line are included in the same group (Group A).

Here, in the initial state, the port section P10 P13 accommodation line may be a backup line and may not be normally used. However, the port section P9 P12 accommodation line and the port section P10 P13 accommodation line are included in the same group (Group A). Therefore the bandwidth allocated to the Group A is increased.

In other words, the bandwidth allocated to Group A is changed from the bandwidth only based on the port section P9 P12 accommodation line to the bandwidth based on both the port section P9 P12 accommodation line and the port section P10 P13 accommodation line. Namely, the bandwidth of Group A is increased by the bandwidth corresponding to the port section P10 P13 accommodation line.

As described above, as a result that the port section P10 P13 accommodation line has the same "VLAN=a" as that of the port section P9 P12 accommodation line and belongs to the same Group A as that of the port section P9 P12 accommodation line, the route R2 described above is not generated (present). This is because, as a result of the link aggregation, the port section P10 P13 accommodation line and the port section P9 P12 accommodation line are theoretically treated as a single line.

Figure 4:
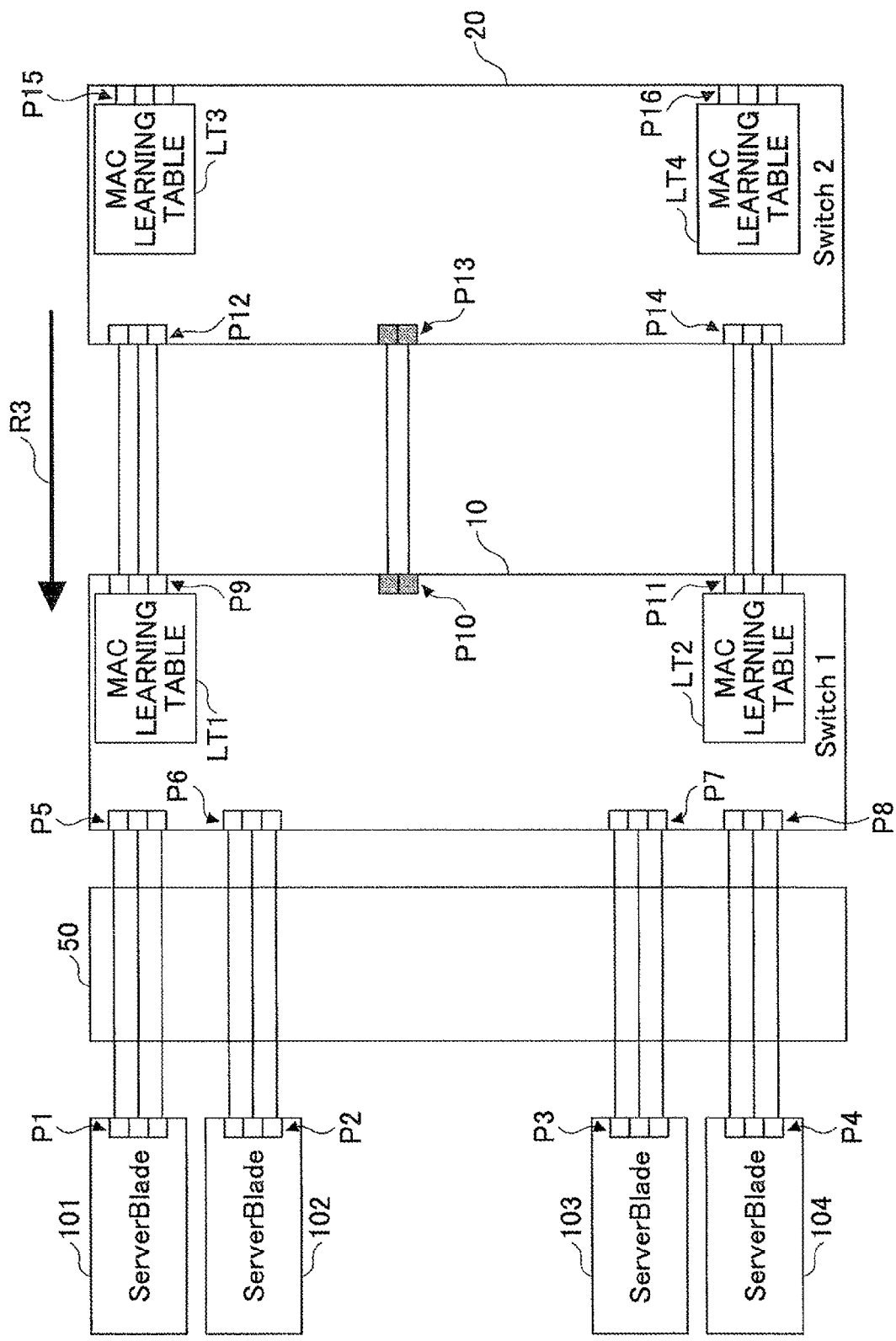
FIG. 4 is still another example block diagram illustrating an operation of the switch device according to the first embodiment.

In this case, as illustrated in FIG. 4, the loop detection packet data transmitted from the loop detection function section 14 of the switch device 20 are further transmitted to the switch device 10 via the port section P9 P12 accommodation line in route R3, but never return to the switch device 20 via the port section P10 P13 accommodation line.

Figure 5:
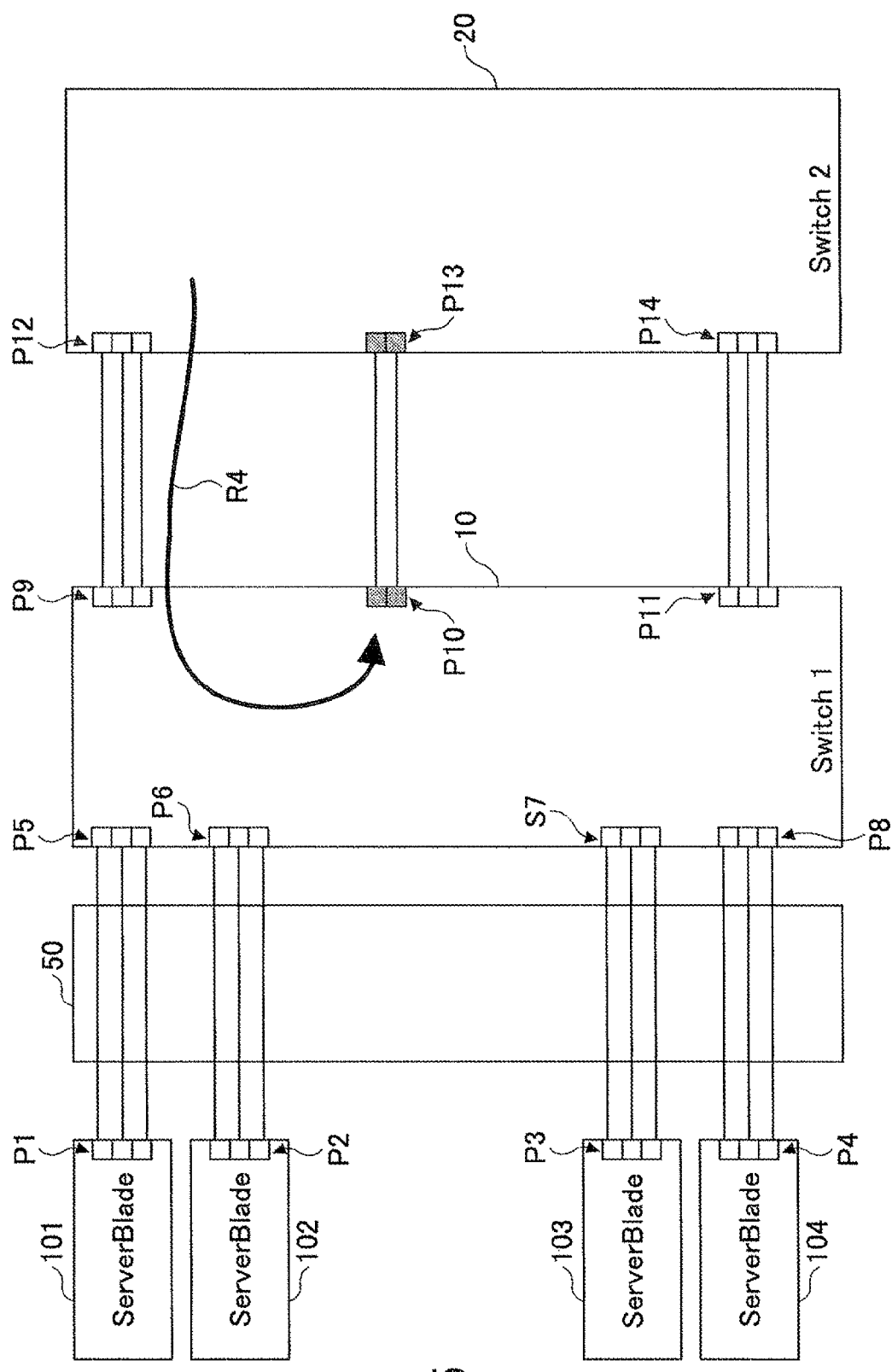
FIG. 5 is still another example block diagram illustrating an operation of the switch device according to the first embodiment.
Figure 6:
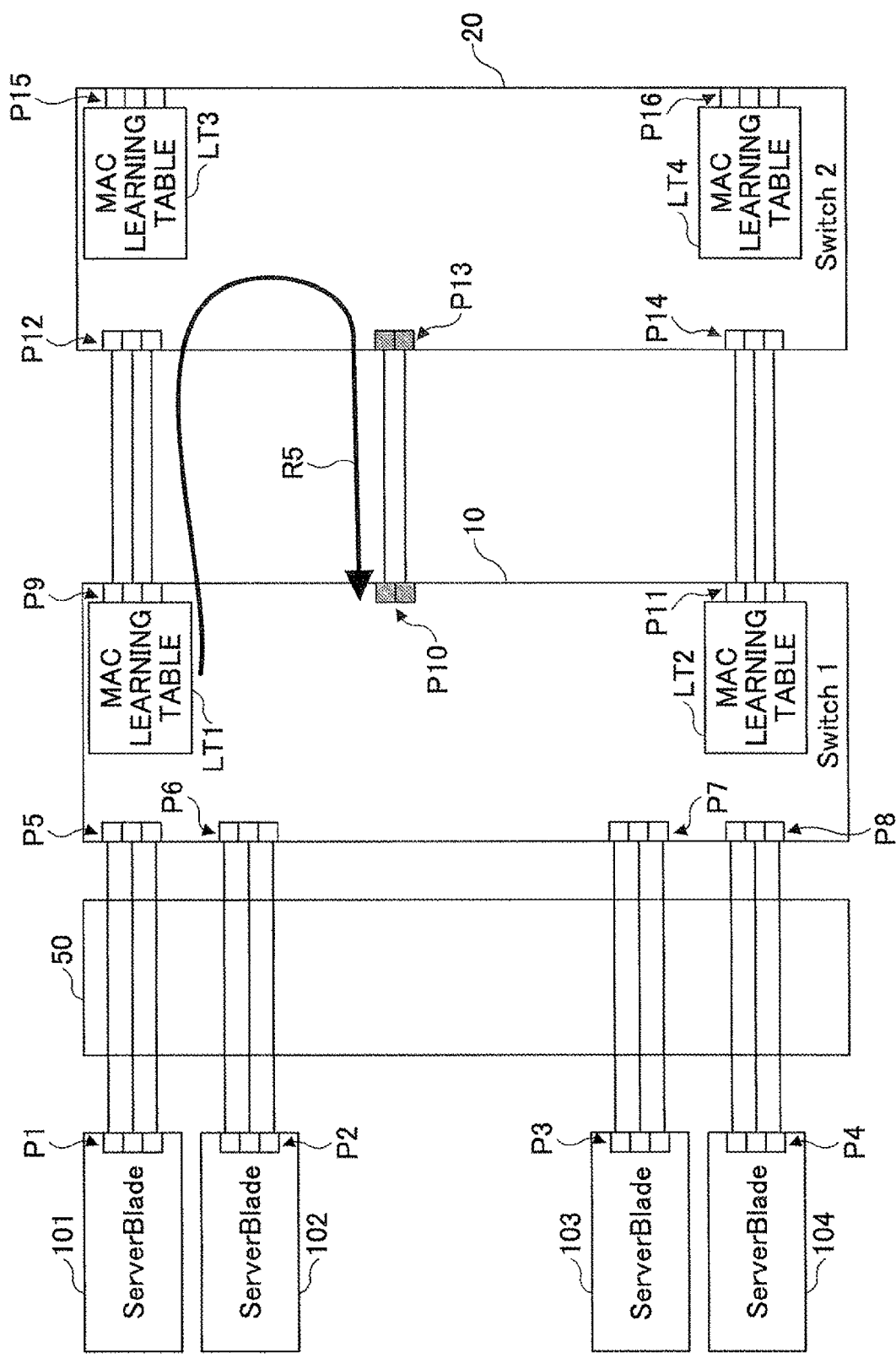
FIG. 6 is still another example block diagram illustrating an operation of the switch device according to the first embodiment.

FIG. 5 illustrates the operations when the MAC learning number of the port section P9 of the switch device 10 is less than or equal to the threshold value set by the user.

In the case of FIG. 4, when the MAC learning number of the port section P9 of the switch device 10 is less than or equal to the threshold value set by the user, the band control section 12 of the switch device 10 detects that the MAC learning number is less than or equal to the threshold value.

Upon detecting that the MAC learning number is less than or equal to the threshold value, the band control section 12 of the switch device 10 changes the group related to the link aggregation of the port section 10 from Group A ("Group A" in case of FIG. 4) back to Group C.

As a result, the link aggregation of the port section P10 P13 accommodation line and the port section P9 P12 accommodation line is disabled. Therefore, the loop of the route R2 as described with reference to FIG. 3 is generated, so that the loop detection packet data transmitted from the loop detection function section 14 of the switch device 20 are further transmitted to the switch device 10 via the port section P9 P12 accommodation line in route R3, and returns to the switch device 20 via the port section P10 P13 accommodation line (Route R4).

After a predetermined time period since the group related to the link aggregation of the port section P10 from Group A back to Group C, the switch device 20 changes the state of the port section P10 to the off-line state.

Preferably, the predetermined time period may be determined to be longer than, for example, a time period from when the loop detection packet data periodically transmitted from the switch device 20 to when the switch device 20 detects the reception of the loop detection packet data which has transmitted between the switch device 20 and the switch device 10 back and force in the route R4.

Further, the switch device 10 changes the VLAN information setting of the port section P10 from "VLAN=a" to "VLAN=c".

The switch device 20 detects that the loop detection packet data transmitted therefrom returns to the switch device 20 via the route R4. Upon detecting the returned loop detection packet data, the switch device 20 changes the VLAN information setting of the port section P13 from "VLAN=a" to "VLAN=c", and further changes the group of the link aggregation to which the port section P13 belongs from Group A to Group C.

As a result, the port section P10 P13 accommodation line between the switch device 10 and the switch device 20 belongs to VLAN=c which is different from the setting of the port section P9 P12 accommodation line. Also, the port section P10 P13 accommodation line belongs to Group C which is different from the group related to the link aggregation of the port section P9 P12 accommodation line.

Namely, the port section P9 and the port section P10 of the switch device 10 are not included in the same group, and the port section P12 and the port section P13 of the switch device 20 are not included in the same group. As a result, the port section P9 P12 accommodation line and the port section P10 P13 accommodation line are not included in the same group. Accordingly, the port section P10 P13 accommodation line serves as a backup line, and the state is returned to that in FIG. 2.

As described above, when the group including the port section P9 P12 accommodation line and the port section P10 P13 accommodation line is dissolved, the bandwidth allocated to the Group A is decreased. Namely, the bandwidth allocated to the Group A is decreased by the difference between the bandwidth allocated to both the port section P9 P12 accommodation line and the port section P10 P13 accommodation line and the bandwidth allocated to only the port section P9 P12 accommodation line. Therefore, the bandwidth of the Group A is decreased by the bandwidth corresponding to the port section P10 P13 accommodation line.

Further, as described with reference to FIGS. 2 through 4, in a case where a group of the port sections (i.e., the port section accommodation lines), the switch device 10 sequentially performs the following processes.

The switch device 10
1) changes the VLAN information of the port section 10 from "VLAN=c" to "VLAN=a";
2) changes the state of the port section 10 to the on-line state; and
3) changes the group of the link aggregation of the port section P10 from Group C to Group A.

Next, a problem is described which may occur if both the process 1) of changing the VLAN information of the port section 10 from "VLAN=c" to "VLAN=a" and the process 3) of changing the group of the link aggregation of the port section P10 from Group C to Group A are performed simultaneously.

It is assumed that the switch device 10 performs the following processes to form a group of the port sections (i.e., the port section accommodation lines). Namely, it is assumed that the process of changing the VLAN information of the port section 10 from "VLAN=c" to "VLAN=a" and the process of changing the group of the link aggregation of the port section P10 from Group C to Group A are performed simultaneously, and then, the process of changing the state of the port section 10 to the on-line state is performed.

In this case, in the switch device 10, due to the link aggregation between the port section P9 and the port section P10, the loop detection packet data from the switch device 20 do not return to the switch device 20. In that case, in the switch device 20, a trigger may not be created to change the VLAN information to "VLAN=a" and change the group of the link aggregation of the port section P13 to Group A. As a result, changing the VLAN information to "VLAN=a" and changing the group of the link aggregation of the port section P13 to Group A may not be performed.

Under such a state, if the state of the port section 10 in the switch device 10 is set to the on-line state, lines between the port section P12 and the port section P13 may not be theoretically treated as a single line due to no link aggregation therebetween in the switch device 20.

Therefore, in the switch device 20, a loop (route R5) may be formed, so that the broadcast packet data from the switch device 10 may be returned back to the switch device 10 via the route R5. If such a loop is generated, the network may eventually fail.

To prevent the occurrence of such a problem, in the first embodiment, as described above, when a group of the port sections (i.e., the port section accommodation lines) is formed (generated), the switch device 10 sequentially performs the following processes.

The switch device 10
1) changes the VLAN information of the port section 10 from "VLAN=c" to "VLAN=a";
2) changes the state of the port section 10 to the on-line state; and,
after a predetermined time period has passed from the above process 2),
3) changes the group of the link aggregation of the port section P10 from Group C to Group A.

Figure 7:
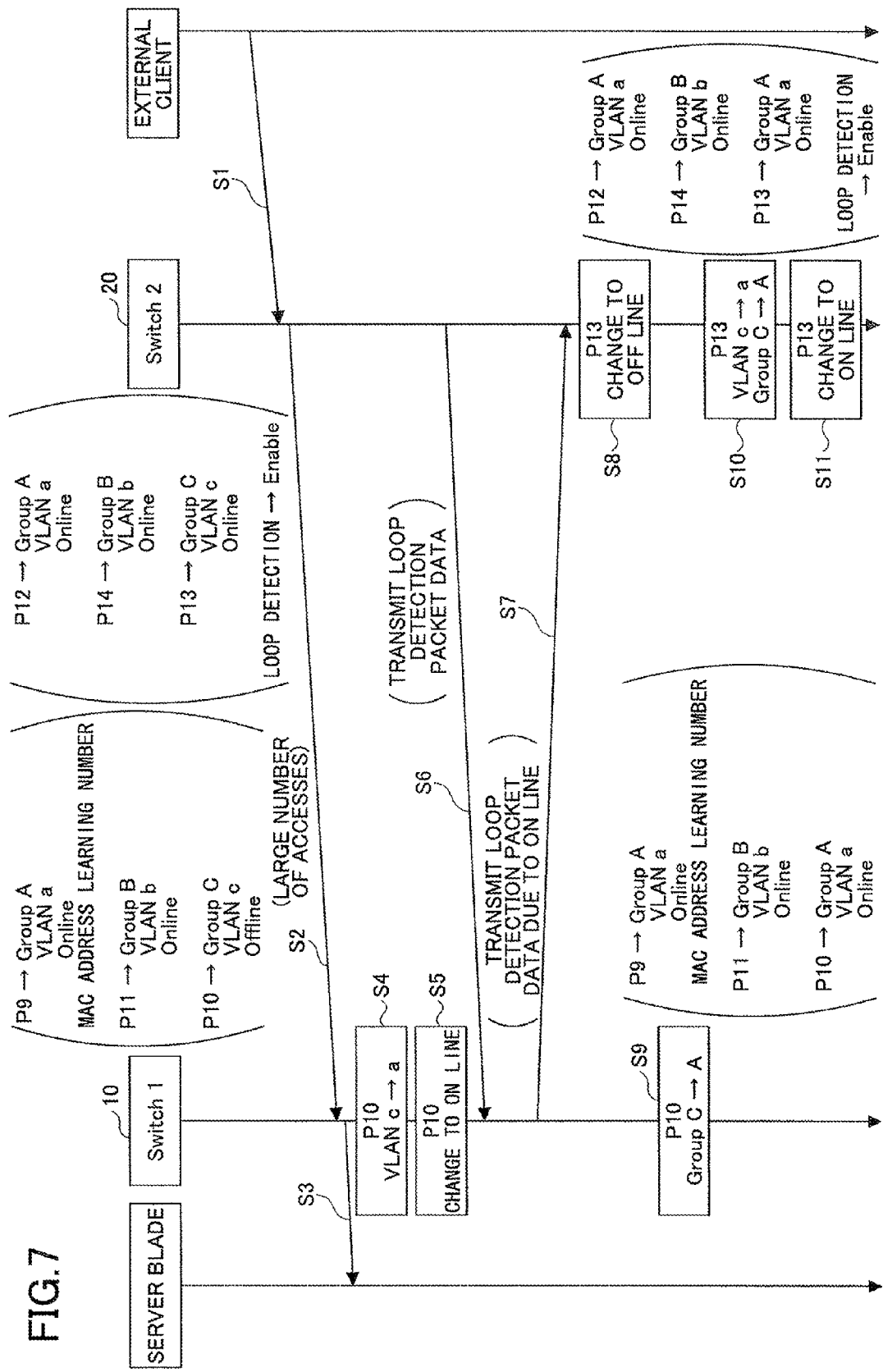
FIG. 7 is an example sequence diagram illustrating an operation of the switch device according to the first embodiment.

Next, with reference to a sequence diagram of FIG. 7, a procedure is described in which a group of the port sections (i.e., the port section accommodation lines) is formed.

In FIG. 7, in steps S1, S2, and S3, it is assumed that communication data are transmitted from plural external clients (e.g., information processing units disposed in another (external) information processing apparatus described above) to the server blades 101 through 104. Here, due to the system design, it is assumed that the transmission data from the plural external clients are transmitted via, for example, the port section P9 P12 accommodation line between the switch device 10 and the switch device 20.

As a result of the transmission of the transmission data from the plural external clients in steps S1, S2, and S3, the learning section 13 of the switch device 10 learns (detects) the MAC address of the source device that originally transmits the transmission data in the MAC learning table LT1 of the port section P9 that receives the transmission data.

As a result of the learning, if the number of the MAC addresses (i.e., the registration entry number or the MAC learning number) in the MAC learning table LT1 exceeds a threshold value set by a user, the band control section 12 of the switch device 10 changes the VLAN information of the port section P10 to "VLAN=c" (step S4), and further changes the state of the port section P10 to the on-line state (step S5).

As a result, the loop detection packet data transmitted from the switch device 20 to the switch device 10 are returned back to the switch device 20 via the port section P10 P13 accommodation line (steps S6 and S7).

The loop detection function section 14 of the switch device 20 detects the returning of the loop detection packet data, and changes the state of the port section P13 that received the loop detection packet data to stop the loop (step S8).

Upon detecting the returning of the loop detection packet data, the switch device 20 changes the VLAN information of the port section P13 to "VLAN=a", and further changes the group of the port section P13 to Group A (step S10).

After that, in step S11, the switch device 20 changes the state of the port section P13 to the on-line state. On the other hand, in step S9, after the predetermined time period has passed as described above, the switch device 10 changes the group of the port section P10 to Group A.

As result, both the port section P10 P13 accommodation line and the port section P9 P12 accommodation line have the same VLAN information "VLAN=a" and belong to the same Group A. Namely, both the port section P10 P13 accommodation line and the port section P9 P12 accommodation line are included in (belong to) the same group.

Next, with reference to the sequence diagram of FIG. 8, also as described with reference to FIGS. 4 and 5, a sequence of separating the port section accommodation lines from the same group is described.

Figure 8:
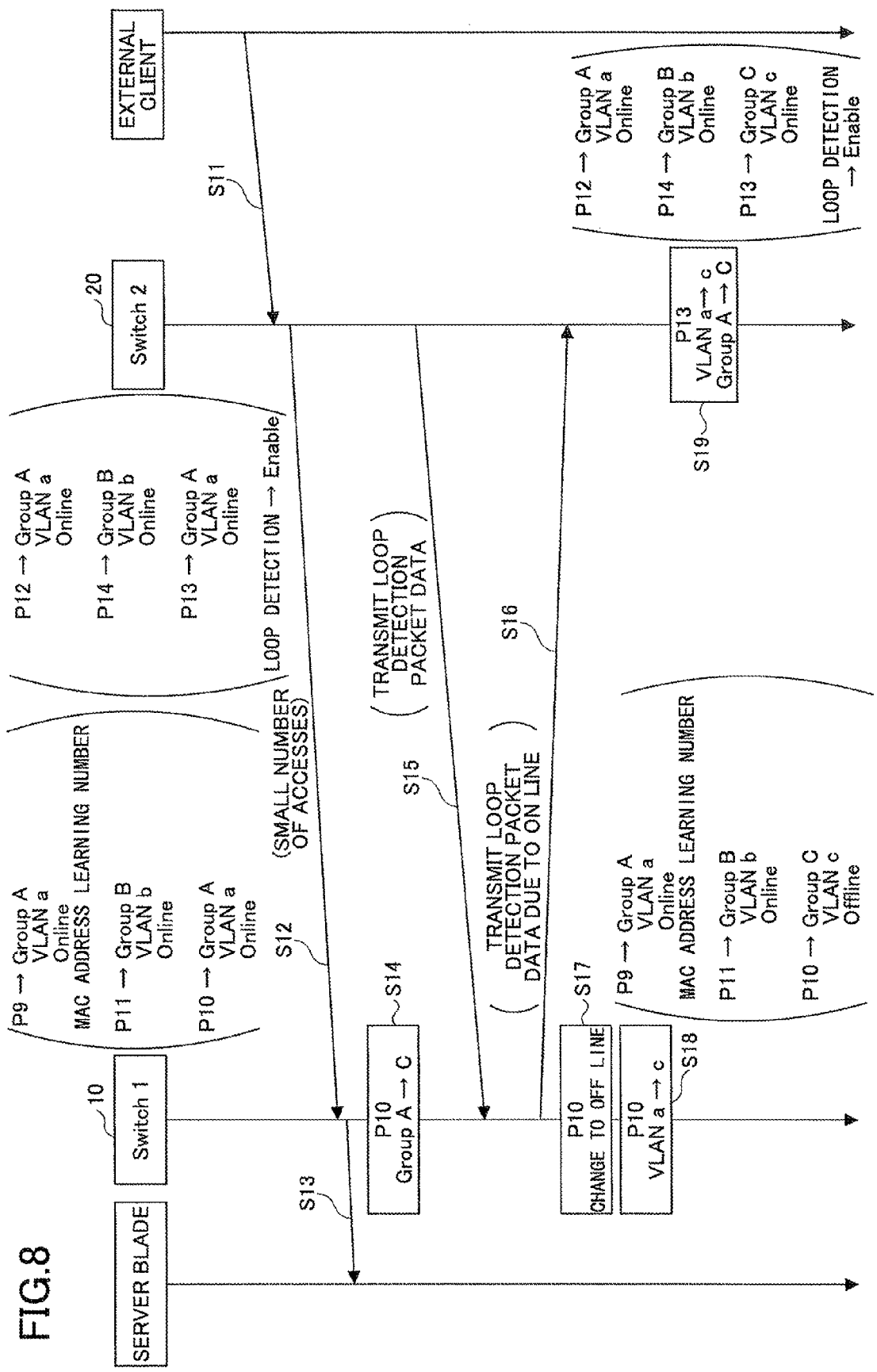
FIG. 8 is another example sequence diagram illustrating an example of the switch device according to the first embodiment.

In FIG. 8, in steps S11, S12, and S13, it is assumed that the amount of communication data is decreased, the communication data being transmitted from plural external clients (e.g., information processing units disposed in another (external) information processing apparatus described above) to the server blades 101 through 104.

Here, similar to the case of FIG. 7, due to the system design of the communication system as illustrated in FIG. 2 and the like, it is assumed that the transmission data from the plural external clients are transmitted via the port section P9 P12 accommodation line between the switch device 10 and the switch device 20.

As a result of the decrease of the amount of the transmission data transmitted from the plural external clients in steps S11, S12, and S13, it is assumed that the number of MAC addresses is decreased, the MAC addresses being registered by the band control section 12 of the switch device 10 into the MAC learning table LT1 of the port section P9 that received the transmission data. Namely, it is assumed that the MAC learning number in the MAC learning table LT1 is decreased.

Further, it is assumed that the MAC learning number in the MAC learning table LT1 is less than or equal to the threshold value set by the user. Here, for the purpose of effective use of the registration capacity of the MAC leaning table, it is also assumed that if the registration entry of the MAC address in the MAC learning table is not used for a certain time period, the registration entry of the MAC address may be automatically deleted via a predetermined process. This process is described below with reference to FIG. 16.

In response to that the MAC learning number in the MAC learning table LT1 is less than or equal to the threshold value, the learning section 13 of the switch device 10 changes the group of the port section 10 to Group C (step S14).

As a result of this, the loop detection packet data transmitted from the switch device 20 to the switch device 10 are returned back if the switch device 20 via the port section P10 P13 accommodation line (steps S15 and S16).

The loop detection function section 14 of the switch device 20 detects the returning of the loop detection packet data. Upon detecting the returning of the loop detection packet data, the loop detection function section 14 of the switch device 20 changes VLAN information of the port section P13 that received the loop detection packet data to "VLAN=c", and further changes the group of the port section P13 to Group C (step S19).

On the other hand, in step S17, after the predetermined time period has passed as described above, the switch device 10 changes the state of the port section P10 to the off-line state. Further, the switch device 10 changes the VLAN information of the port section P10 to "VLAN=c".

As a result, the port section P10 P13 accommodation line and the port section P9 P12 accommodation line do not belong to the same group, so that the port section P10 P13 accommodation line serves as a backup line having the VLAN information "VLAN=c" and belongs to Group C.

As described above, according to the first embodiment, the bandwidth is controlled by considering the increase/decrease of the MAC learning number as the increase/decrease of the bandwidth desired by the communication lines for the purpose of effective use of the lines used in communications with devices disposed outside the information processing apparatus.

The control of the bandwidth may be achieved by forming or dissolving the group of the port sections accommodating the lines.

Further, according to the first embodiment, it may become possible to dynamically change the allocation of the communication resources (communication lines) in response to the change of the situation including, for example, the increase or decrease of the server blades. Also, it may become possible to improve the use rate of the communication resources.

Further, as described above, it may become possible to automatically and dynamically control the allocations of the communication resources in response to the change of the situation including the increase and decrease of the server blades. Therefore, it may become possible to reduce human cost and prevent the connection failure or the like.

Next, with reference to FIGS. 9 through 13, a second embodiment is described. A switch device 10X according to the second embodiment has substantial the same configuration and effects as those of the switch device 10 according to the first embodiment. Therefore, the descriptions of the same parts (elements) as those in the first embodiment may be omitted.

In the switch device 10X according to the second embodiment, the port sections P21 through P26 are divided into three groups Group A, Group B, and Group C. In the initial state as illustrated in FIG. 9, the port sections P21 and P22 belong to Group A, the port sections P25 and P26 belong to Group B, and the port sections P23 and P24 belong to Group C.

Further, in this case of the second embodiment, it is assumed that the server blades 101 and 102 belong to Group A and the server blades 103 and 104 belong to Group B.

Further, the lines accommodated by all the port sections belonging to Group A are theoretically treated as a single line by link aggregation. Also, the lines accommodated by all the port sections belonging to Group B are theoretically treated as a single line by link aggregation. Further, the same VLAN information is set to all the port sections belonging to Group A. Also, the same VLAN information is set to all the port sections belonging to Group B.

Figure 9:
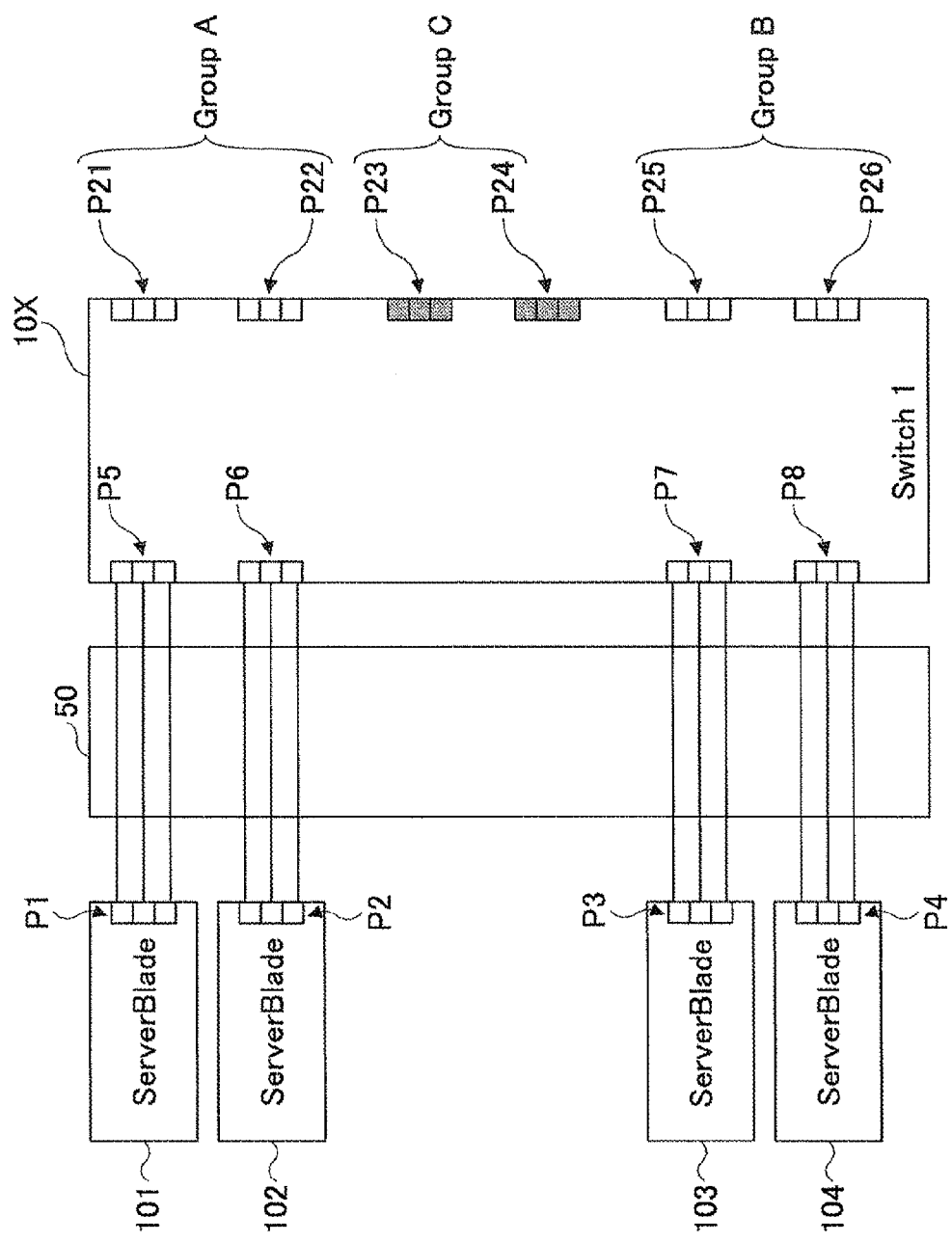
FIG. 9 is an example block diagram illustrating an operation of the switch device according to the second embodiment.

Therefore, in the state of FIG. 9, the server blades 101 and 102 communicate with external clients using the port section P1 P5 accommodation line and the port section P2 P6 accommodation line, respectively, and also via the port section P21 accommodation line (not shown) and the port section P22 accommodation line (not shown).

Similarly, the server blades 103 and 104 communicate with external clients using the port section P3 P7 accommodation line and the port section P4 P8 accommodation line, respectively, and also via the port section P25 accommodation line (not shown) and the port section P26 accommodation line (not shown).

In the second embodiment, the MAC learning number is acquired (calculated) for each of the server blades in each of the groups Group A and Group B. In other words, the MAC learning number is acquired on a per interface basis. Then, the acquired MAC learning number is compared with a threshold value.

In the state of FIG. 9, for example, it is assumed that the MAC learning number of Group A is 40. On the other hand, the number of server blades belonging to Group A is 2. Therefore, the MAC learning number per server blade in Group A is calculated: 40/2=20.

When it is assumed that the threshold value is 100, this value (100) is greater than the calculated value (20). Therefore, it is not desired to perform grouping of the port sections (lines).

It is assumed that the MAC learning number of Group B is 80. On the other hand, the number of server blades belonging to Group B is also 2. Therefore, the MAC learning number per server blade in Group B is calculated: 80/2=40. As described above, the threshold value is 100. Therefore, the calculated value (40) is less than the threshold value (100). Therefore, it is not desired to perform grouping of the port sections (lines).

Further, in the case of FIG. 9, it is assumed that the lines connected to the port sections P23 and P24 belonging to Group C are backup lines or common lines and are not used. To that end, the state of the port sections P23 and P24 is set to the off-line state to prevent the formation of a loop.

Figure 10:
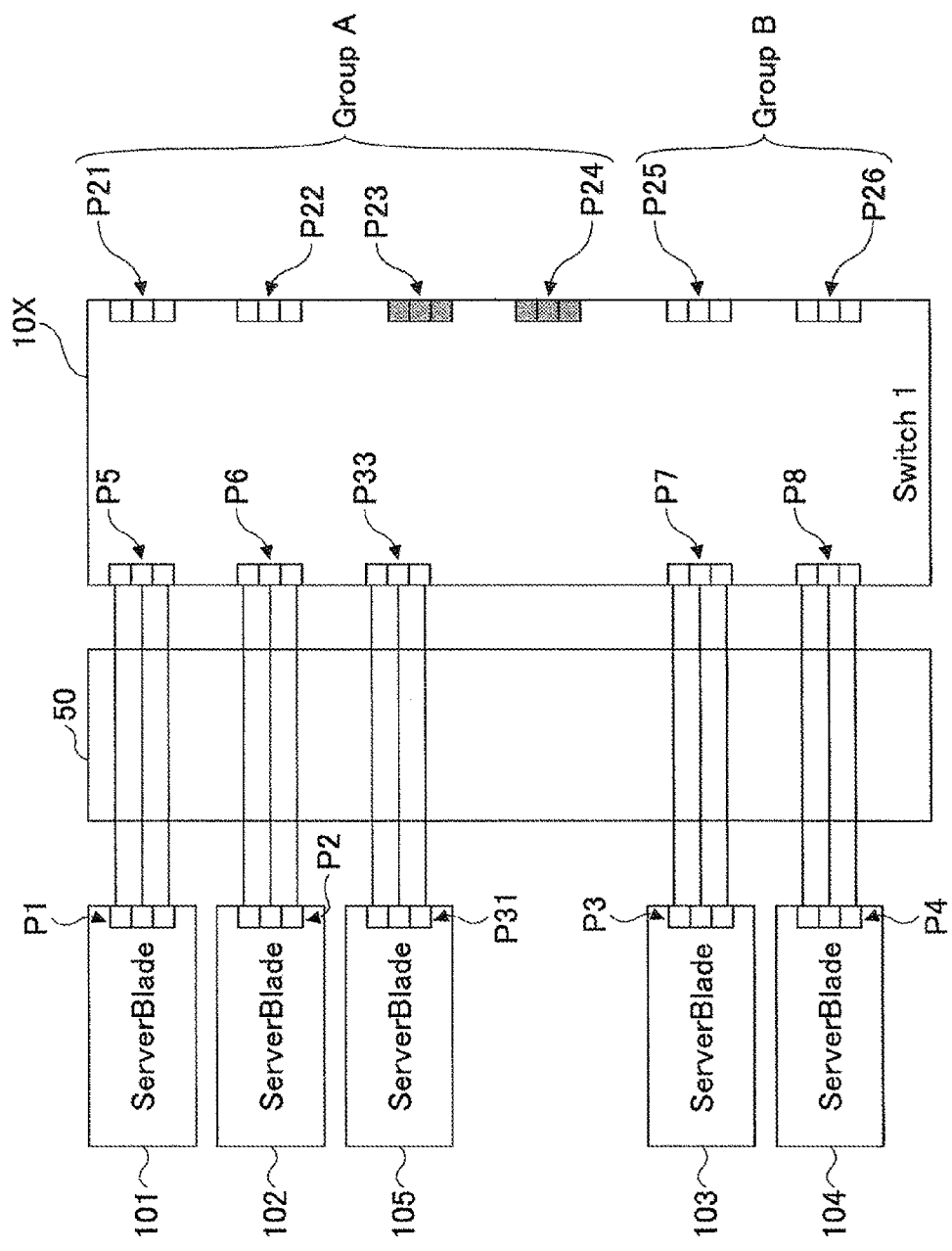
FIG. 10 is another example block diagram illustrating an operation of the switch device according to the second embodiment.

In comparison with FIG. 9, a server blade 105 is additionally provided in FIG. 10. The server blade 105 is connected to the switch device 10X via port sections P31 and P33. Here, it is assumed that the server blade 105 as well as the server blades 101 and 102 belongs to Group A.

In the state of FIG. 10, it is assumed that the MAC learning number of Group A is 600. The number of server blades belonging to Group A is 3 (server blades 101, 102, and 105). Therefore, the MAC learning number per server blade in Group A is calculated: 600/3=200. As described above, the threshold value is 100. Therefore, the calculated value (200) is greater than the threshold value (100). Therefore, it may be desired to perform grouping of the port sections (lines) in Group A.

On the other hand, it is assumed that the MAC learning number of Group B is 100. The number of server blades belonging to Group B is 2 (server blades 103 and 104). Therefore, the MAC learning number per server blade in Group B is calculated: 100/2=50. As described above, the threshold value is 100. Therefore, the calculated value (50) is less than the threshold value (100). Therefore, it may not be desired to perform grouping of the port sections (lines) in Group B.

Therefore, in this case, it may be desired to perform grouping by using the Group A, which is desired to perform grouping, and the port sections P23 and P24, in Group C, belonging to the common line. Namely, the grouping is performed on the port sections P23 and P24 and the port section P21 and P22, so that all the port sections P21, P22, P23, and P24 belong to the same Group A.

As a result, it may become possible for the server blades 101, 102, and 105 to communicate with external clients by using the port section P1 P5 accommodation line, the port section P2 P6 accommodation line, and port section P31 P33 accommodation line, respectively, and also via the port section P21 accommodation line, the port section P22 accommodation line, the port section P23 accommodation line (not shown), and the port section P24 accommodation line (not shown).

Figure 11:
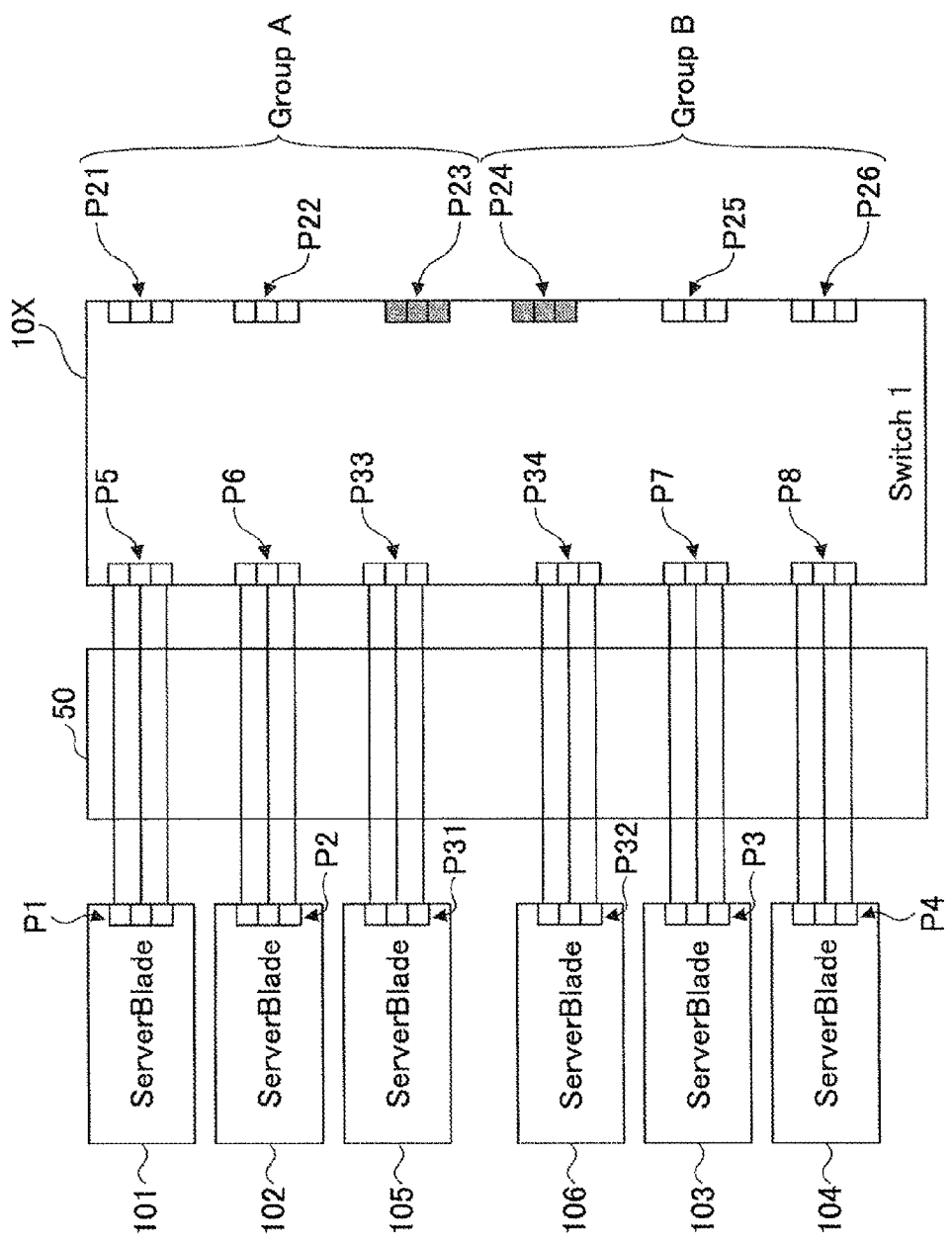
FIG. 11 is still another example block diagram illustrating an operation of the switch device according to the second embodiment.

In comparison with FIG. 9, two server blades 105 and 106 are additionally provided in FIG. 11. Similar in FIG. 10, the server blade 105 is connected to the switch device 10X via the port sections P31 and P33. The server blade 106 is connected to the switch device 10X via port sections P32 and P34. Here, it is assumed that the server blade 105 as well as the server blades 101 and 102 belongs to Group A. On the other hand, it is assumed that the server blade 106 as well as the server blades 103 and 104 belongs to Group B In the state of FIG. 11, it is assumed that the MAC learning number of Group A is 600. The number of server blades belonging to Group A is 3 (server blades 101, 102, and 105). Therefore, the MAC learning number per server blade in Group A is calculated: 600/3=200. As described above, the threshold value is 100.

Therefore, the calculated value (200) is greater than the threshold value (100). Therefore, it may be desired to perform grouping of the port sections (lines) in Group A.

On the other hand, it is assumed that the MAC learning number of Group B is 900. The number of server blades belonging to Group B is also 3 (server blades 103, 104, and 106). Therefore, the MAC learning number per server blade in Group A is calculated: 900/3=300. As described above, the threshold value is 100. Therefore, the calculated value (300) is greater than the threshold value (100). Therefore, it may be desired to perform grouping of the port sections (lines) in Group B as well.

Therefore, in this case, the grouping of the port sections may be performed on Group A and Group B by using (including) the port section P23 and the port section P24, respectively, of Group C. Namely, the grouping is performed on the port section P23 and the port sections P21 and P22, so that the port sections P21, P22, and P23 are included in Group A. Also, the grouping is performed on the port section P24 and the port sections P25 and P26, so that the port sections P24, P25, and P26 are included in Group B.

As a result, it may become possible for the server blades 101, 102, and 105 to communicate with external clients by using the port section P1 P5 accommodation line, the port section P2 P6 accommodation line, and port section P31 P33 accommodation line, respectively, and also via the port section P21 accommodation line, the port section P22 accommodation line, and the port section P23 accommodation line.

Similarly, it may become possible for the server blades 103, 104, and 106 to communicate with external clients by using the port section P3 P7 accommodation line, the port section P4 P8 accommodation line, and port section P32 P34 accommodation line, respectively, and also via the port section P24 accommodation line, the port section P25 accommodation line, and the port section P26 accommodation line.

Figure 12:
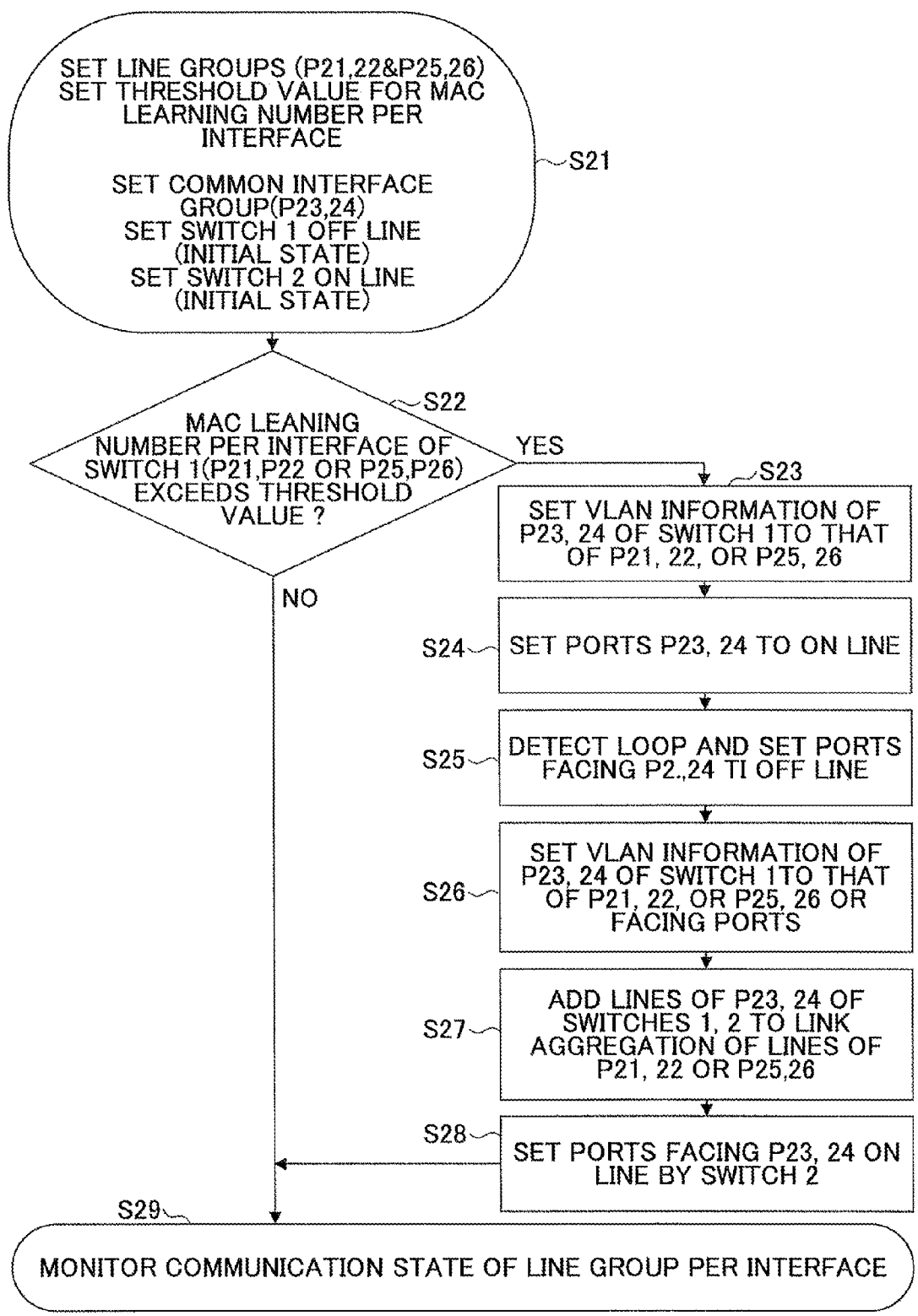
FIG. 12 is an example flowchart illustrating an operation of the switch device according to the second embodiment.
Figure 13:
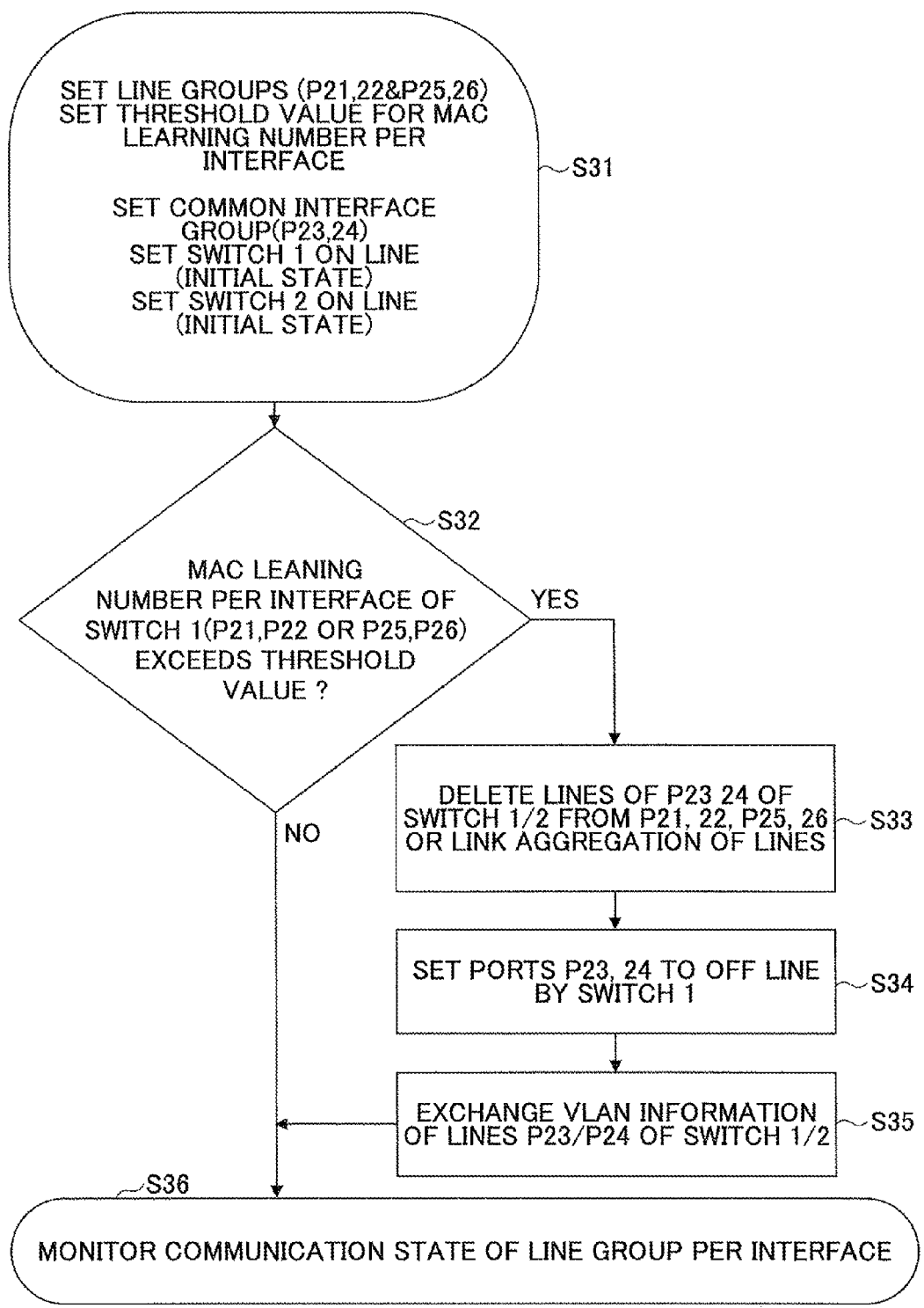
FIG. 13 is another example flowchart illustrating an operation of the switch device according to the second embodiment.

FIGS. 12 and 13 are example flowcharts illustrating operations in the second embodiment described with reference to FIGS. 9 through 11.

FIG. 12 illustrates a flow of the grouping of the port sections. As illustrated in FIG. 12, in the initial state, a user sets the threshold value per server blade for each of Group A, Group B, and Group C.

The user also sets Group C (port sections P23 and P24) as a common line. Similar to the case in the first embodiment, the lines of Group C are set in a manner that the line on the switch 10X side is set to the off-line state and the line on the side facing another switch device (not shown) is set to the on-line state (step S21).

In step S22, the band control section 12 of the switch device 10X determines whether the MAC learning number exceeds the threshold value for each of Group A (port sections P21 and P22) and Group B (port sections P25 and P26). When it is determined that none of the MAC learning numbers exceed the respective threshold values (NO in step S22), the process goes to step S29 to continuously monitor the MAC learning numbers.

On the other hand, when it is determined that there is the MAC learning number that exceeds the threshold value in at least one of Group A and Group B (YES in step S22), the process goes to step S23. In step S23, the band control section 12 of the switch device 10X performs the following operations.

Namely, the band control section 12 of the switch device 10X sets the VLAN information of Group C to be the same as that of the group whose MAC learning number exceeds the threshold value, so that, in other words, the Group C and the group, whose MAC learning number exceeds the threshold value, have the same VLAN information to each other.

Next in step S24, the band control section 12 of the switch device 10X sets the state of the port sections P23 and P24 of Group C to the on-line state. As a result, similar to the first embodiment, the loop detection packet data from the other switch device (Switch 2 in the figures) are returned back to the other switch device from the switch device 10X via the port section P23 accommodation line and the port section P24 accommodation line.

As a result, the other switch device detects a loop including the port section P23 accommodation line and the port section P24 accommodation line, and stops the loop by setting the port section P23 accommodation line and the port section P24 accommodation line to the off-line state (step S25).

Further, upon detecting the loop, the other switch device sets the VLAN information of the lines (i.e., the port section P23 accommodation line and the port section P24 accommodation line) belonging to Group C to the same VLAN information as that of the lines belonging to the group whose MAC learning number exceeds the above threshold value (step S26).

Further, in step S27, both the switch device 10X and the other switch device add the lines belonging to Group C to the link aggregation of the lines belonging to the group whose MAC learning number exceeds the above threshold value. Namely, the lines belonging to the group whose MAC learning number exceeds the above threshold value and the lines belonging to Group C are theoretically treated as a single line by the link aggregation.

After that, the other switch device sets the state of the lines back to the on-line state, the state of the lines having been set to the off-line state in step S25, and the lines being belonged to Group C.

As a result, it may become possible to use the lines between the switch device 10X and the other switch device as the lines belonging to the group whose MAC learning number exceeds the above threshold value, the lines being formerly belonged to Group C. After this, the process goes to step S29.

FIG. 13 illustrates a cancelling operation of the grouping of the port sections. As illustrated in FIG. 13, in the initial state in step S31, a user sets the threshold value corresponding to the MAC learning number per server blade for each of Group A and Group B.

In this case, it is assumed that the lines of Group C are already included in at least one of the Group A and Group B and are being operated as the lines belonging to at least one of Group A or Group B. Therefore, the state of the lines, which was included in Group C, on both the switch 10X side and the other switch device side is set to the on-line state.

In step S32, the band control section 12 of the switch device 10X determines whether the MAC learning number is less than or equal to the threshold value for each of Group A (port sections P21) and Group B (port sections P25 and P26). When the band control section 12 determines that none of the MAC learning numbers is less than or equal to the threshold (NO in step S32), the process goes to step S36 to continue monitoring the MAC learning numbers.

On the other hand, when the band control section 12 determines that the MAC learning numbers is less than or equal to the threshold value in at least one of the Group A and Group B (YES in step S32), the process goes to step S33.

In step S33, the band control section 12 of the switch device 10X separates the line from the link aggregation of the group whose MAC learning numbers is less than or equal to the threshold value, the line being accommodated by at least one of the port sections P23 and P24 (former Group C) and being included in the group whose MAC learning numbers is less than or equal to the threshold value.

In other words, the line, which is included in the group MAC learning numbers is less than or equal to the threshold value and which is accommodated by at least one of the port section P23 and the port section P24, is set to be treated as a line theoretically different from the line of the group whose MAC learning numbers is less than or equal to the threshold value.

Next, in step S34, the band control section 12 of the switch device 10X sets the state of at least one of the port sections P23 and P24 included in the group including a group whose MAC learning numbers is less than or equal to the threshold value.

Next, in step S35, the band control section 12 of the switch device 10X sets the VLAN information of the line to the VLAN information different from that in the group whose MAC learning numbers is less than or equal to the threshold value, the line belonging to the group whose MAC learning numbers is less than or equal to the threshold value, the line being included in the group including at least one of the Group A and Group B, the line being accommodated by at least one of the port sections P23 and P24.

In other words, the line, which is included in the group whose MAC learning numbers is less than or equal to the threshold value and which is accommodated by at least one of the port sections P23 and P24, is set to have the VLAN information different from that of the line belonging to the group whose MAC learning numbers is less than or equal to the threshold value. By doing this, the line accommodated by at least one of the port sections P23 and P24 is returned to the backup line (Group C). After that, the process in step S36 is performed.

Figure 14:
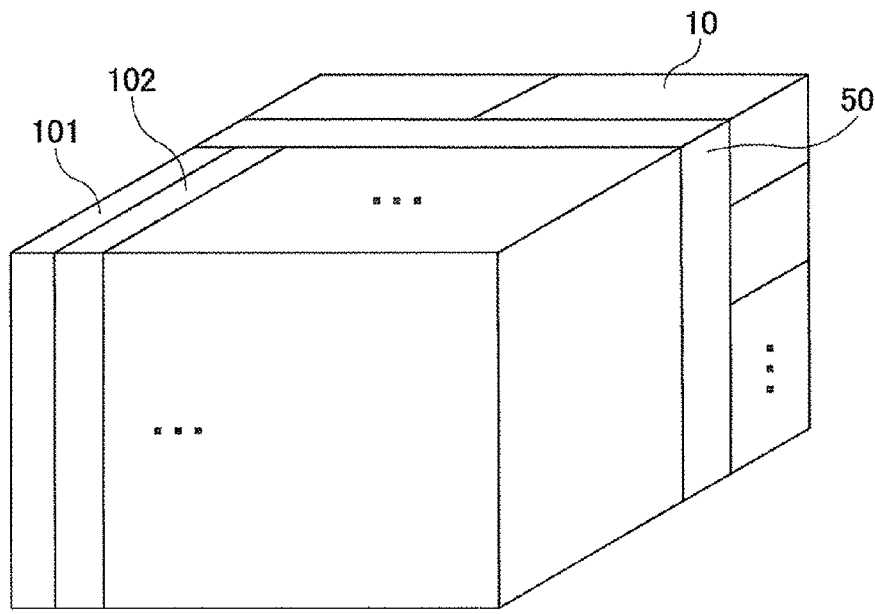
FIG. 14 is a perspective view illustrating an example entire configuration of an image processing apparatus (blade server) including the switch device according to the first or the second embodiment.

FIG. 14 is a perspective view illustrating an example arrangement of the information processing apparatus (i.e., blade server) according to the first and second embodiments. In the blade server, plural server blades are disposed on the front side, a switch blade 10 is dispose on the rear side, and the mid plane 50 is disposed in the middle.

Figure 15A:
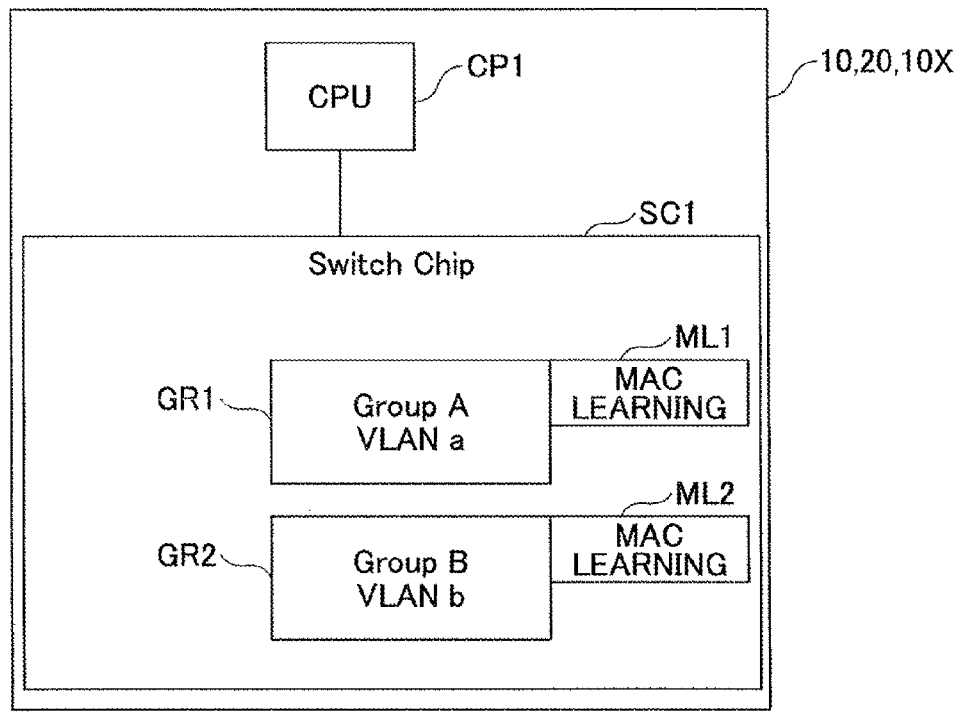
FIG. 15A is another example block diagram of a switch device according to the first or the second embodiment.
Figure 15B:
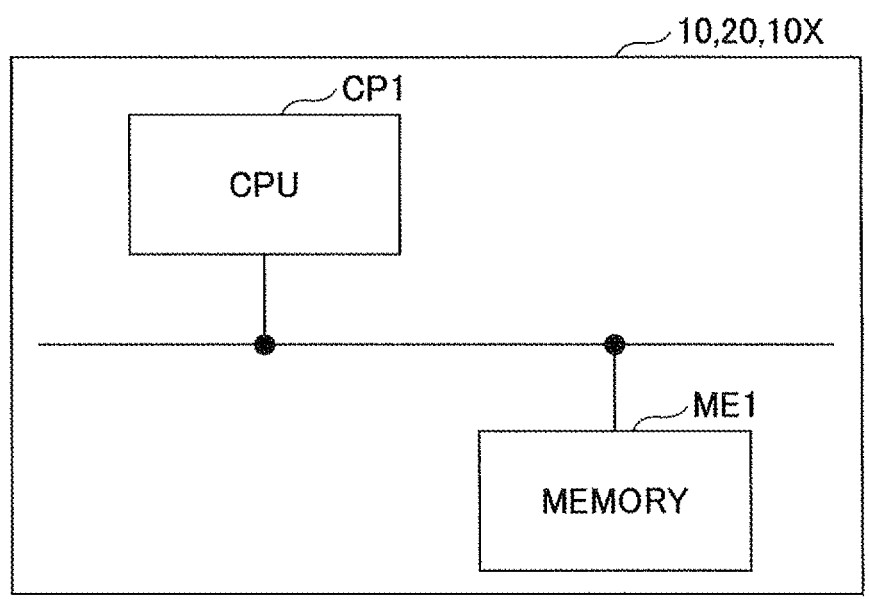
FIG. 15B is still another example block diagram of a switch device according to the first or the second embodiment.

FIGS. 15A and 15B are block diagrams illustrating example hardware configurations of switch devices 10, 20, 10X and the like.

As illustrated in FIGS. 15A and 15B, each switch device includes a Central Processing Unit (CPU) CP1, and a memory ME1. The memory ME1 may have a form of Switch Chip (Large Scale Integrated circuit (LSI) Chip). A program is stored in the memory ME1, and by executing the program by the CPU CP1, the functions of the above switch device described with reference to FIGS. 1 through 13 may be realized.

FIG. 15A illustrates some examples of the realized functions. Namely, in the switch devices, a link aggregation function (GR1, GR2) related to Group A, Group B and the like, a VLAN function (GR1, GR2) related VLAN a, VLAN b and the like, and a MAC learning function (ML1, ML2) may be realized.

Next, an example process of the MAC learning according to the first and the second embodiment is described with reference to FIG. 16. As illustrated in FIG. 16, in step S41, an external client performs link up with the switch device so as to communicate with the server blade 101 or the like in the information processing apparatus via the switch device (switch, e.g., the switch device 20 or the like).

Namely, for example, both the external client and the switch device set the state of the port sections accommodating the lines to be used by both the external client and the switch device to be the on-line state.

Next, in step S42, the external client transmits an Address Resolution Protocol (ARP) request. The ARP request in this case may include the Internet Protocol (IP) address of the server blade with which the external client has a desire to communicate, and also include information requesting the MAC address of the blade server.

Upon receiving the ARP request, the switch device registers the MAC address of the transmission source (i.e. the external client) included in the ARP request into the MAC table. Namely, the switch device performs the MAC learning on the external client (step S43). As a result, in the switch device, the number of the MAC addresses of the port sections accommodating the linked-up lines is increased by one.

Next, in step S44, the switch device returns the ARP reply. In this case, the switch device may include the MAC address of the server blade, with which the external client has the desire to communicate, as the transmission source address of the returning ARP reply.

To that end, the switch device may manage address data by associating the MAC addresses with the corresponding IP addresses of the server blades to be managed by the switch device. The external client having received the ARP reply registers the MAC address, included in the ARP reply, of the server blade into the MAC learning table.

Namely, the external client performs the MAC learning on the server blade (step S45). Based on the MAC learning, the external client starts communications using the MAC address of the blade server to be communicated as the destination address (step S46).

After that, when the transmission of the communication data from the external client is completed and the communication is terminated, the switch device transmits an ARP request to request permission to delete the relevant MAC learning to the external client (step S47).

After the transmission of the ARP request, if there is no reply from the external client for a predetermined time period (e.g., three minutes) (step S48), the switch device may delete the entry related to the external client from the MAC learning table. As a result, in the switch device, the MAC learning number of the relevant port section is decreased by one.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of superiority or inferiority of the invention. Although the embodiments of the present inventions has been described in detail, it is to be understood that various changes, substitutions, and alterations could be made hereto without departing from the spirit and scope of the invention.

What is claimed is:

1. A switch device comprising:
a relay circuitry configured to relay communication data when information processors included in an information processing apparatus perform communications with external devices;
an address learning circuitry configured to register ports that receive the communication data in association with addresses indicating transmission sources of the communication data; and
a band control circuitry configured to control a bandwidth to be allocated to the communications by grouping a first port and a second port of the ports to belong to a same group and by grouping the first port and the second port to belong to different groups based on a number of the addresses indicating the transmission sources registered by the address learning circuitry in association with each of the ports.

2. The switch device according to claim 1,
wherein the information processing apparatus includes a first number of the information processors,
wherein the first port is allocated to a second number of the information processors amongst the first number of the information processors,
wherein the band control circuitry is configured to, when the number of the addresses indicating the transmission sources registered by the address learning circuitry per information processor corresponding to the first port exceeds a predetermined threshold value, group the first port and the second port to belong to the same group to increase a bandwidth to be allocated to the second number of the information processors, and
wherein the band control circuitry is further configured to, when the number of the addresses indicating the transmission sources registered by the address learning circuitry per information processor corresponding to the first port is less than or equal to the predetermined threshold value, group the first port and the second port to belong to the different groups to decrease the bandwidth to be allocated to the second number of the information processors.

3. The switch device according to claim 1, wherein the band control circuitry is configured to, when presetting the second port to an off-line state and grouping the first port and the second port to belong to the same group, generate a loop via lines accommodated by the first port and the second port by changing the second port to an on-line state.

4. An information processing apparatus comprising:
information processors; and
a switch device including
a relay circuitry configured to relay communication data when information processors included in an information processing apparatus perform communications with external devices,
an address learning circuitry configured to register ports that receive the communication data in association with addresses indicating transmission sources of the communication data, and
a band control circuitry configured to control a bandwidth to be allocated to the communications by grouping a first port and a second port of the ports to belong to a same group and by grouping the first port and the second port to belong to different groups based on a number of the addresses indicating the transmission sources registered by the address learning circuitry in association with each of the ports.

5. The information processing apparatus according to claim 4,
wherein the information processing apparatus includes a first number of the information processors,
wherein the first port is allocated to a second number of the information processors amongst the first number of the information processors,
wherein the band control circuitry is configured to, when the number of the addresses indicating the transmission sources registered by the address learning circuitry per information processor corresponding to the first port exceeds a predetermined threshold value, group the first port and the second port to belong to the same group to increase a bandwidth to be allocated to the second number of the information processors, and wherein the band control circuitry is further configured to, when the number of the addresses indicating the transmission sources registered by the address learning circuitry per information processor corresponding to the first port is less than or equal to the predetermined threshold value, group the first port and the second port to belong to the different groups to decrease the bandwidth to be allocated to the second number of the information processors.

6. The information processing apparatus according to claim 4, wherein the band control circuitry is configured to, when presetting the second port to an off-line state and grouping the first port and the second port to belong to the same group, generate a loop via lines accommodated by the first port and the second port by changing the second port to an on-line state.

7. A method of controlling a switch device included in an information processing apparatus, the method comprising:
   relaying, by a relay circuitry of the switch device, communication data when information processors included in the information processing apparatus perform communications with external devices;
   registering, by an address learning circuitry of the switch device, ports that receive the communication data in association with addresses indicating transmission sources of the communication data; and
   controlling, by a band control circuitry of the switch device, a bandwidth to be allocated to the communications by grouping a first port and a second port of the ports to belong to a same group and by grouping the first port and the second port to belong to different groups based on a number of the addresses indicating the transmission sources registered by the address learning circuitry in association with each of the ports.

8. The method according to claim 7,
wherein the information processing apparatus includes a first number of the information processors, and the first port is allocated to a second number of the information processors amongst the first number of the information processors,
wherein the controlling, when the number of the addresses indicating the transmission sources registered by the registering per information processor corresponding to the first port exceeds a predetermined threshold value, groups the first port and the second port by the band control circuitry to belong to the same group to increase a bandwidth to be allocated to the second number of the information processors, and
wherein the controlling, when the number of the addresses indicating the transmission sources registered by the registering per information processor corresponding to the first port is less than or equal to the predetermined threshold value, groups the first port and the second port by the band control circuitry to belong to the different groups to decrease the bandwidth to be allocated to the second number of the information processors.

9. The method according to claim 7, wherein the controlling, when presetting the second port to an off-line state and grouping the first port and the second port to belong to the same group, generates a loop via lines accommodated by the first port and the second port by the band control circuitry by changing the second port to an on-line state.

* * * * *